(12) United States Patent
Kaneda et al.

(10) Patent No.: US 7,519,226 B2
(45) Date of Patent: Apr. 14, 2009

(54) FORM SEARCH APPARATUS AND METHOD

(75) Inventors: Kitahiro Kaneda, Kanagawa (JP);
Ken-ichi Kazumi, Kanagawa (JP);
Tomotoshi Kanatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 11/127,188

(22) Filed: May 12, 2005

(65) Prior Publication Data
US 2005/0238257 A1    Oct. 27, 2005

Related U.S. Application Data

(62) Division of application No. 09/571,411, filed on May 15, 2000, now Pat. No. 6,970,601.

(30) Foreign Application Priority Data

| May 13, 1999 | (JP) | ............... 1999-133071 |
| Jan. 27, 2000 | (JP) | ............... 2000-019148 |
| May 11, 2000 | (JP) | ............... 2000-138449 |

(51) Int. Cl.
*G06K 9/62* (2006.01)
(52) U.S. Cl. ............ 382/224; 382/190; 382/209; 382/278
(58) Field of Classification Search ........... 382/173, 382/190, 209, 224, 278, 282
See application file for complete search history.

(56) References Cited

U.S. PATENT DOCUMENTS

| 4,376,932 A | 3/1983 | Cassada ............ 382/216 |
| 4,606,069 A | 8/1986 | Johnsen ............ 382/243 |
| 5,228,100 A | 7/1993 | Takeda et al. ......... 382/175 |
| 5,235,653 A | 8/1993 | Nakano et al. ......... 382/61 |
| 5,274,714 A | 12/1993 | Hutcheson et al. ....... 382/157 |
| 5,680,478 A | 10/1997 | Wang et al. .......... 382/176 |

(Continued)

FOREIGN PATENT DOCUMENTS

EP    0 516 576    12/1992

(Continued)

OTHER PUBLICATIONS

Pizano, A. et al., "A Business Form Recognition System", 15th Ann. Int'l. Computer Software & Applns. Conf., IEEE Computer Soc. Press, 1991, pp. 626-632.

(Continued)

*Primary Examiner*—Yosef Kassa
(74) *Attorney, Agent, or Firm*—Fitzpatrick, Cella, Harper & Scinto

(57) ABSTRACT

Forms such as business forms used in banks and post offices are automatically classified using a form search apparatus and method. The method of classifying forms comprises extracting features from the image data of the input form and comparing the extracted features with stored features of a set of template forms corresponding to a set of known classifications of forms. The comparing step compares extracted features which comprise attributes of tables contained in the template forms and the input form respectively. The attributes of tables may be the number of tables in the form, or the number of cells comprising the tables. An approximate matching step is used to reduce the number of candidate template forms.

48 Claims, 23 Drawing Sheets

U.S. PATENT DOCUMENTS

| | | | |
|---|---|---|---|
| 5,721,940 A | 2/1998 | Luther et al. | 715/506 |
| 5,729,630 A * | 3/1998 | Ikeda | 382/229 |
| 5,835,634 A | 11/1998 | Abrams | 382/222 |
| 6,108,677 A | 8/2000 | Kiuchi et al. | 707/100 |
| 6,654,758 B1 * | 11/2003 | Teague | 707/101 |
| 6,720,965 B1 * | 4/2004 | Hirosawa et al. | 345/423 |
| 6,721,488 B1 * | 4/2004 | Dimitrova et al. | 386/46 |
| 6,975,755 B1 * | 12/2005 | Baumberg | 382/154 |

FOREIGN PATENT DOCUMENTS

| | | |
|---|---|---|
| EP | 0 654 751 | 5/1995 |

OTHER PUBLICATIONS

Wang et al., "Block Selection: A Method for Segmenting Page Image of Various Editing Styles", IEEE, vol. 1, Aug. 14, 1995, pp. 128-133.

"Open Source Computer Vision Library, Reference Manual", Intel Corp., © 1999-2001.

Akiyama et al., "Automated Entry System for Printed Documents", 1023 Pattern Recognition, 23(1990)No. 11, pp. 1141-1154, Head. Hill Hall, Oxford, GB.

Cattoni et al., "Geometric Alyout Analysis Techniques for Document Image Understanding: A Review", ITC-IRST Tech. Report #9607-09, Istituto Trentino di Cultura, Jan. 1998.

Bunke et al., "Handbook of Character Recognition and Document Image Analysis", World Scientific Publ. Corp., pp. 104, 241, 1997.

* cited by examiner

AREA SEGMENTING PROCESS

FIG.6A
| b | b | b |
|---|---|---|
| b | a | b |
| b | b | b |
FIG.6B
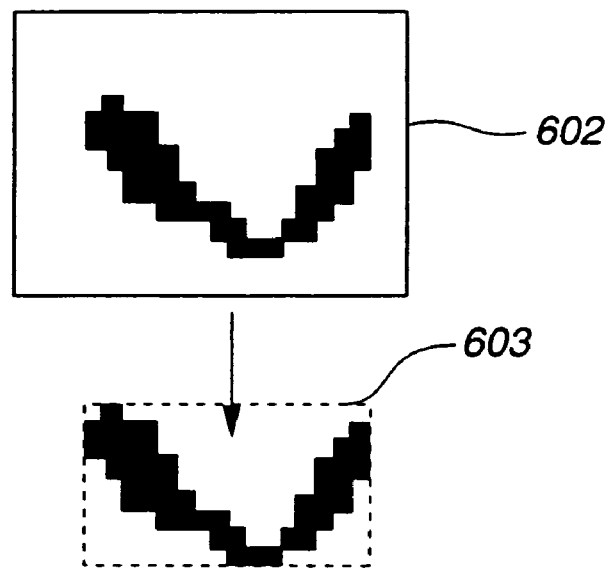
FIG.6C
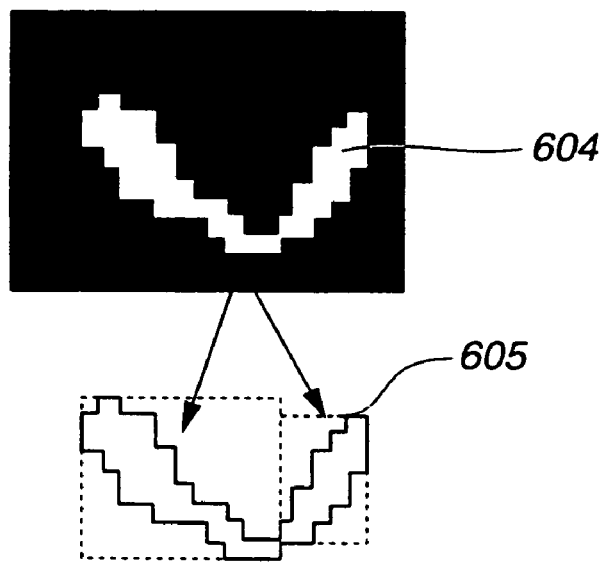

FIG.8A 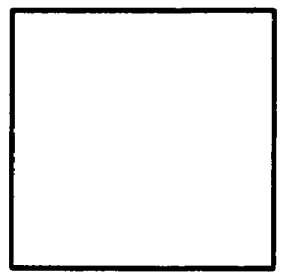  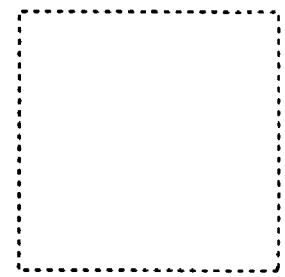
FRAME
FIG.8B 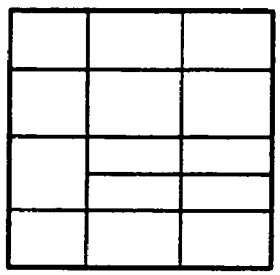  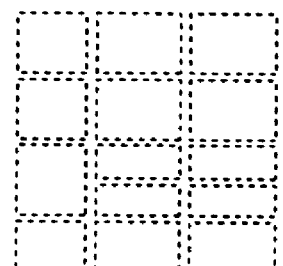
TABLE
FIG.8C 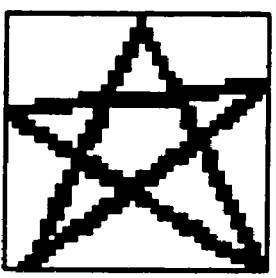  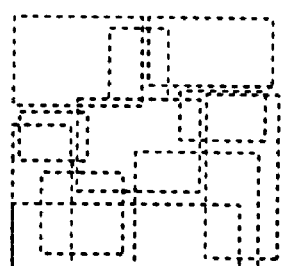
FIGURE

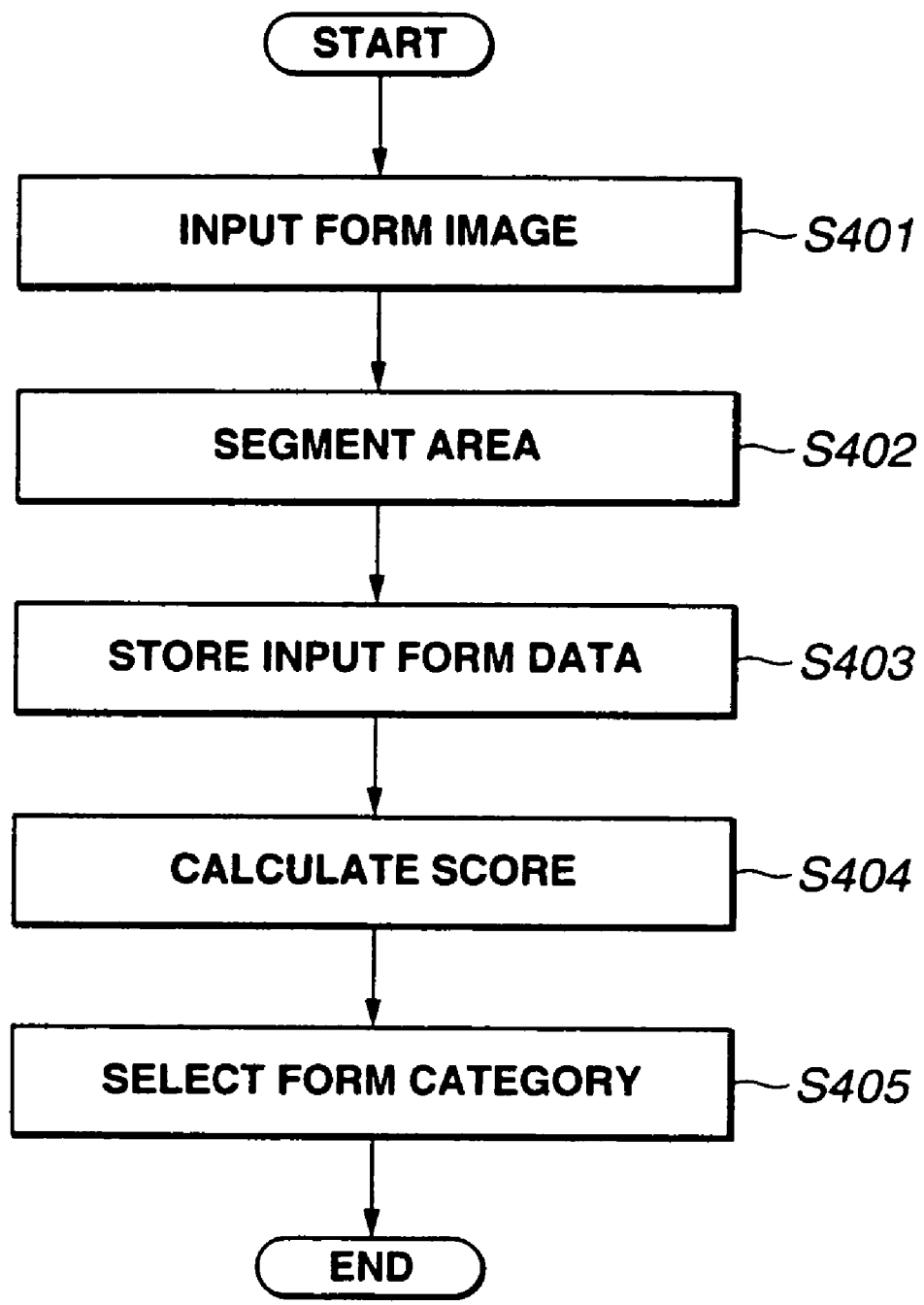

FIG.15

FIRST CONDITION FOR APPROXIMATE MATCHING

THE NUMBERS OF TABLES ARE THE SAME AND THE NUMBERS OF CELLS IN THE LARGEST TABLE ARE THE SAME

SECOND CONDITION FOR APPROXIMATE MATCHING

THE NUMBERS OF TABLES ARE THE SAME AND THE DIFFERENCE BETWEEN NUMBERS OF CELLS IN THE LARGEST TABLES IS SMALLER THAN OR EQUAL TO A THRESHOLD VALUE

THIRD CONDITION FOR APPROXIMATE MATCHING

THE NUMBERS OF EXTRACTED AREAS IS THE SAME

FORM SEARCH APPARATUS AND METHOD

This application is a continuation application of co-pending U.S. application Ser. No. 09/571,411, filed May 15, 2000, which is incorporated herein by reference.

The present invention relates to searching and identifying images. In particular, but not exclusively, the invention relates to a form processing method, apparatus and data carrier for use in identifying an input form as being similar or identical to one of a number of previously registered forms or templates.

Nowadays, the use of fast speed and high efficiency scanners is increasing and there is increasing demand for digitizing images of tables and figures printed on paper and for mass processing of such images.

Existing devices which process various kinds of images classify images on the basis of a comparison between the image and a number of previously registered images referred to as templates.

It is known from Arturo Pizano et al, "A Business Form Recognition System", COMPSAC91 Proceedings, The 15th Annual International Computer Software and Applications Conference, Sep. 13, 1991, pp 626 to 632, to process business forms such as cancelled cheques, insurance claims and credit card vouchers using a business form recognition system which scans each form and performs a comparison between the scanned image data and templates in a dictionary to determine the classification of the input form. The disclosed method of operation looks for similarity between a pattern of lines detected in the scanned form and a pattern of lines classified in the dictionary of templates.

A character recognition system has also been proposed in U.S. Pat. No. 5,680,478 which uses block segmentation as a classification method. The block segmentation process comprises a process for extracting black blocks of pixels and white blocks of pixels. The process also allows the identification of blocks having attributes such as picture, figure, table, frame and line.

There remains a need to provide improved accuracy in the automatic processing and classification of forms.

The present invention discloses a method of classifying forms with reference to a set of template forms by comparing extracted features which comprise attributes of tables contained in the template forms and the input form respectively.

A preferred embodiment utilises an approximate matching step whereby a set of candidates template forms are preselected and only the set of candidate template forms are subjected to the detailed comparing step.

Preferably the approximate matching step comprises a plurality of preselection steps, each having a respective degree of approximation of matching between a template form and the input form, and wherein the degrees of approximation are different from one another to provide a range of different degrees of approximation.

In the preferred embodiment, the preselection steps may be applied in a predetermined order in which the degree of approximation progressively increases, and wherein if any selection of at least one matching template form occurs within a preselection step, the selected template forms are subject to the detailed comparing step without performing further preselection steps.

Improved efficiency and speed are therefore obtained.

Preferred embodiments will now be described by way of example only and with reference to the accompanying drawings of which:

Figure 7A:
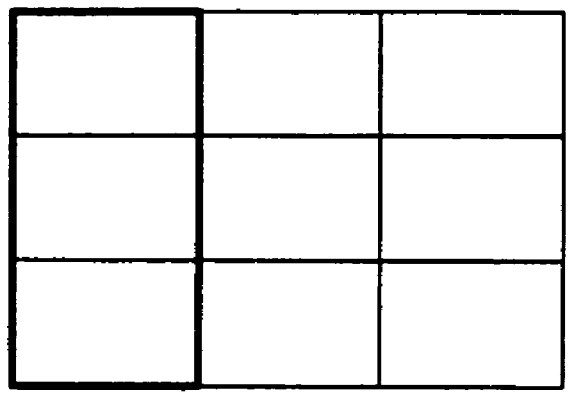
Figure 7B:
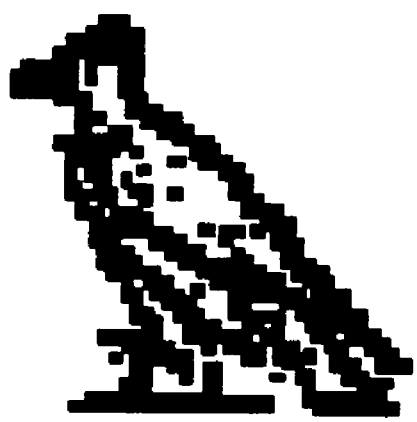
Figure 10:
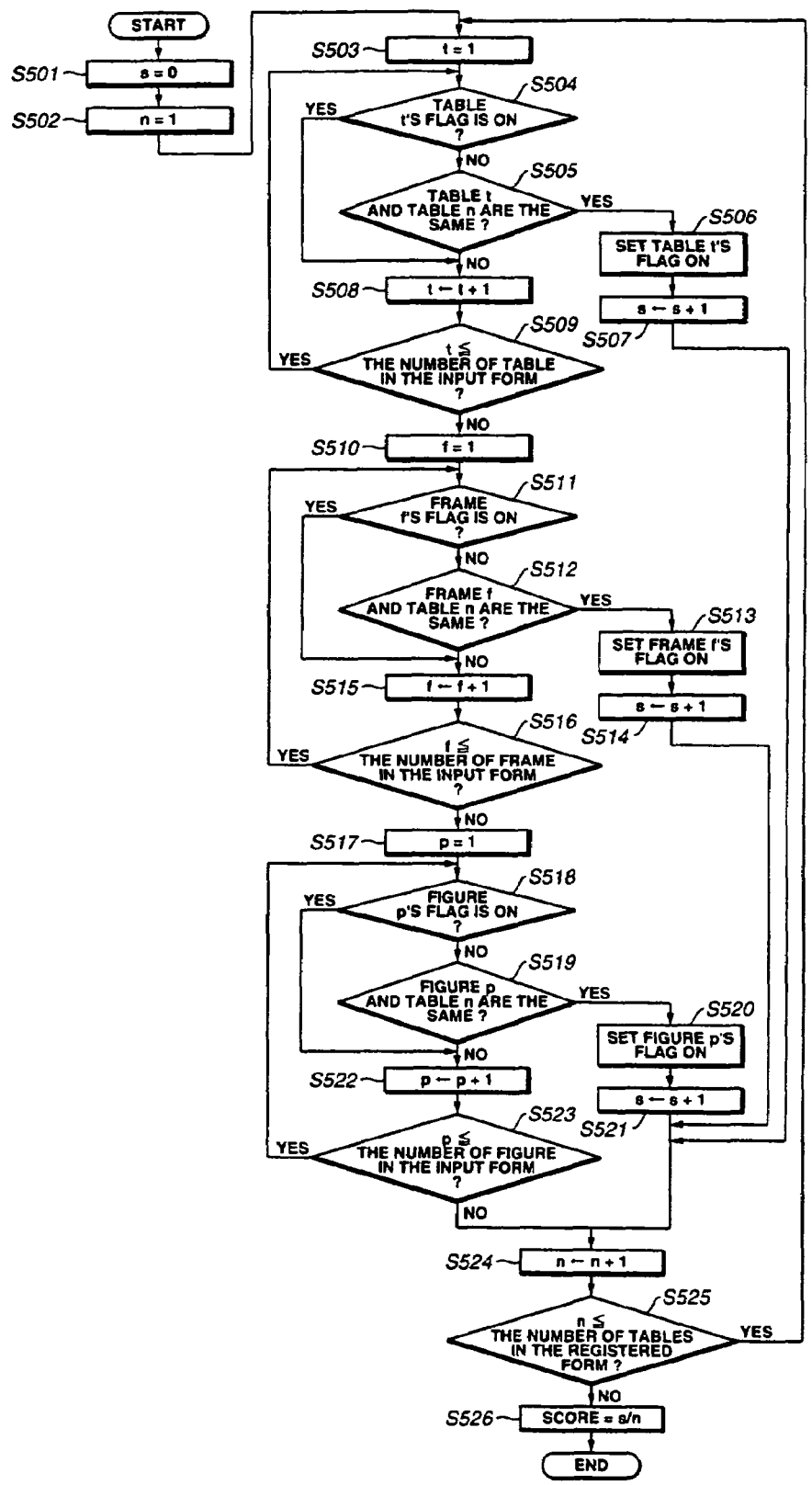
Figure 11:
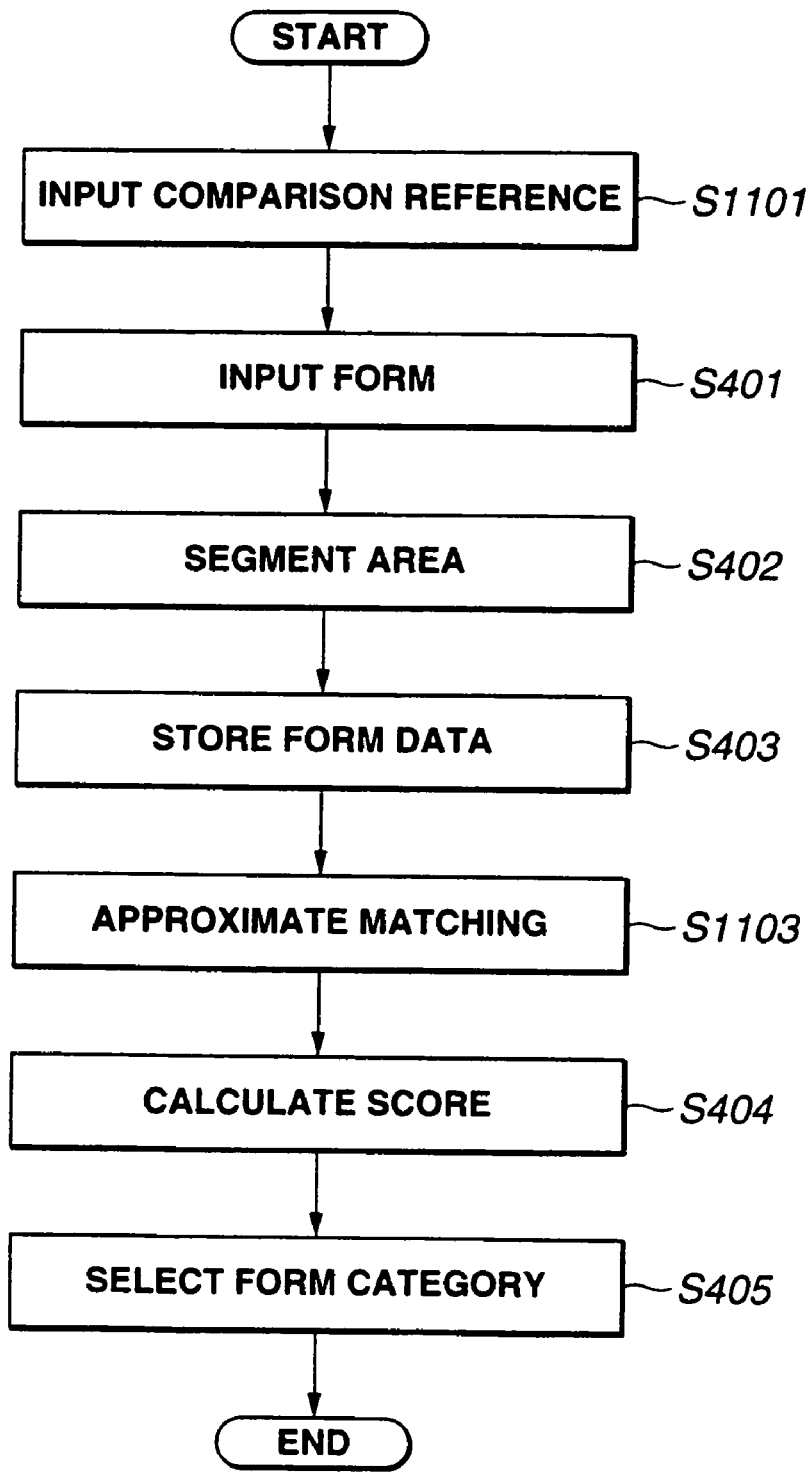
Figure 12:
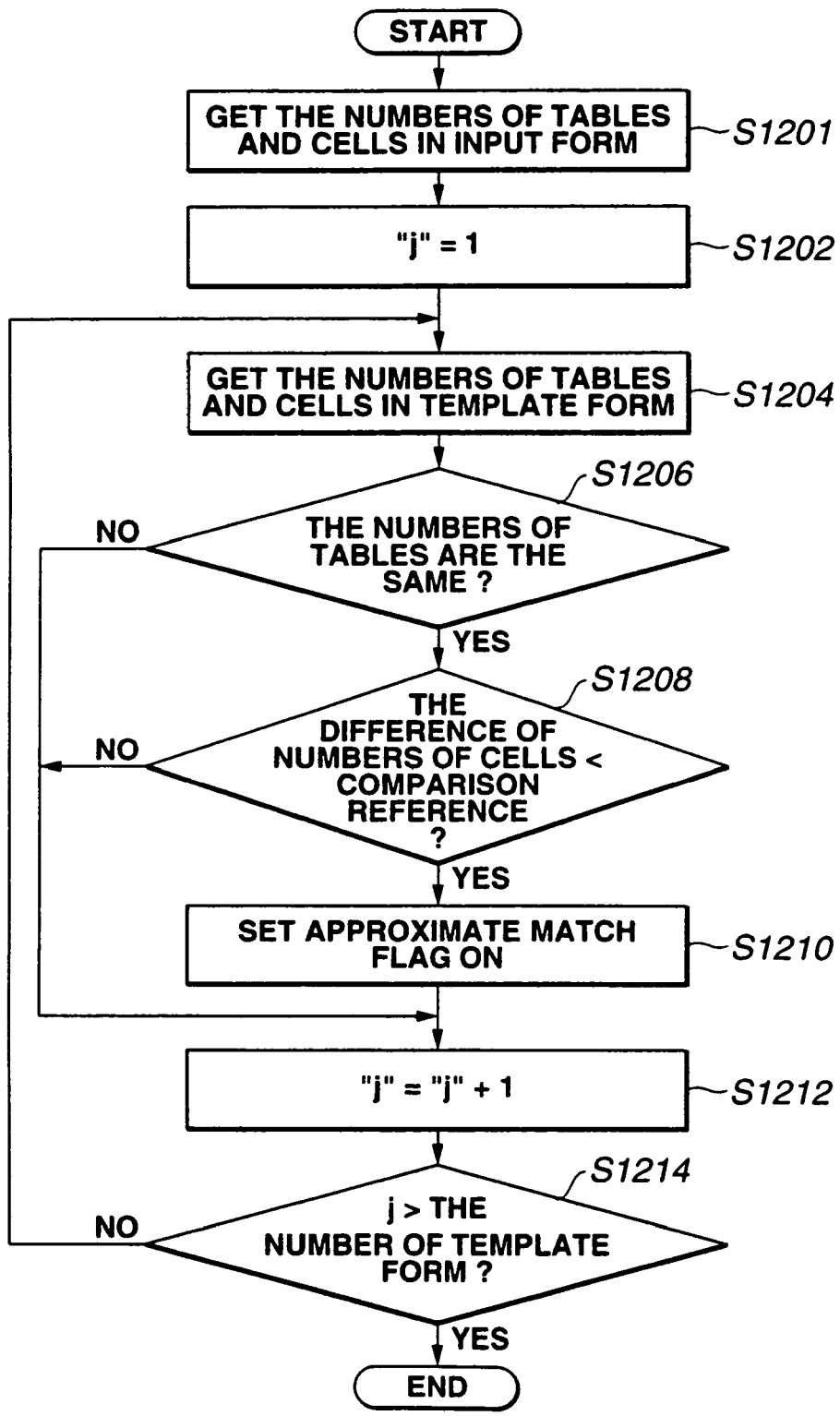
Figure 13:
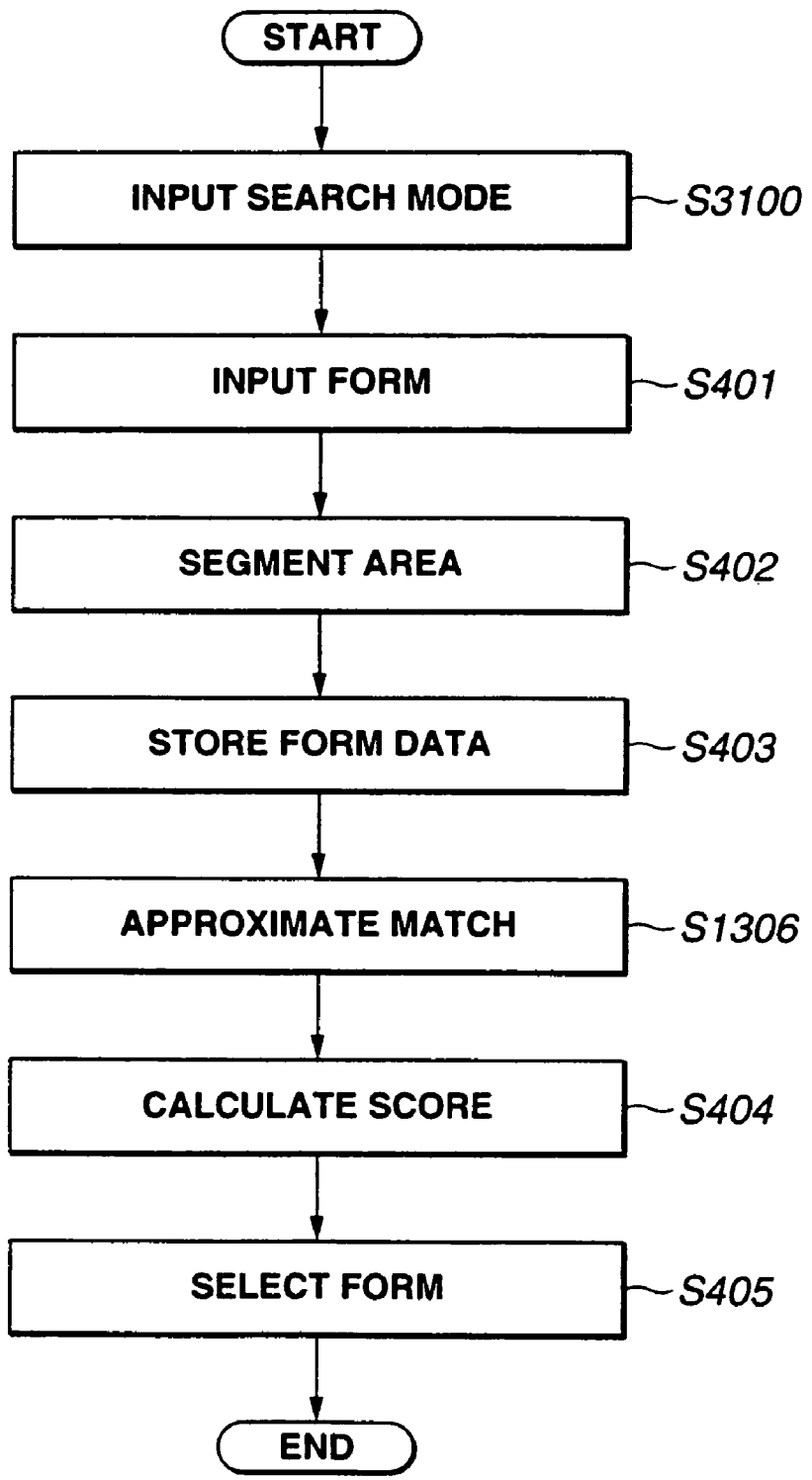
Figure 14:
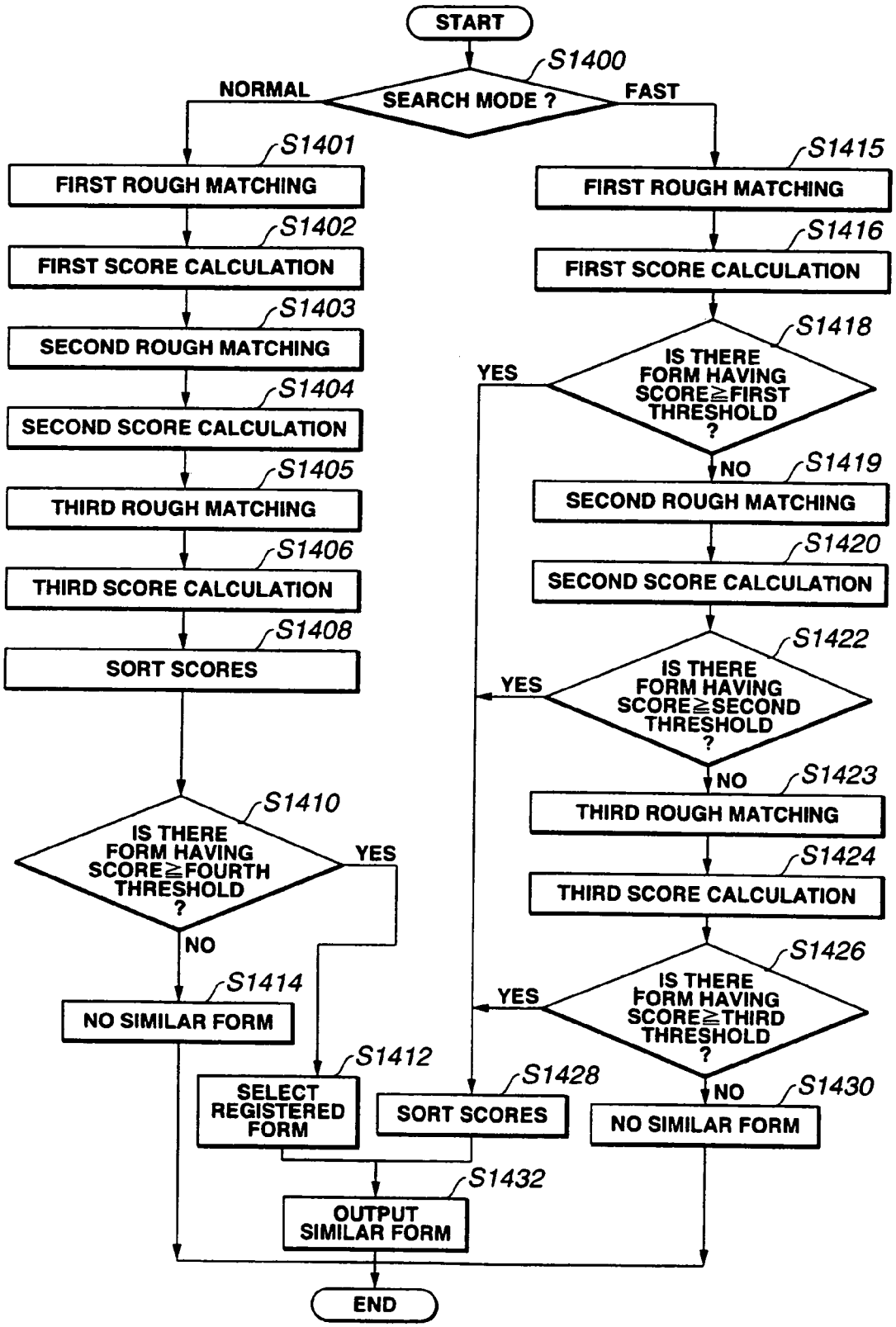
Figure 16:
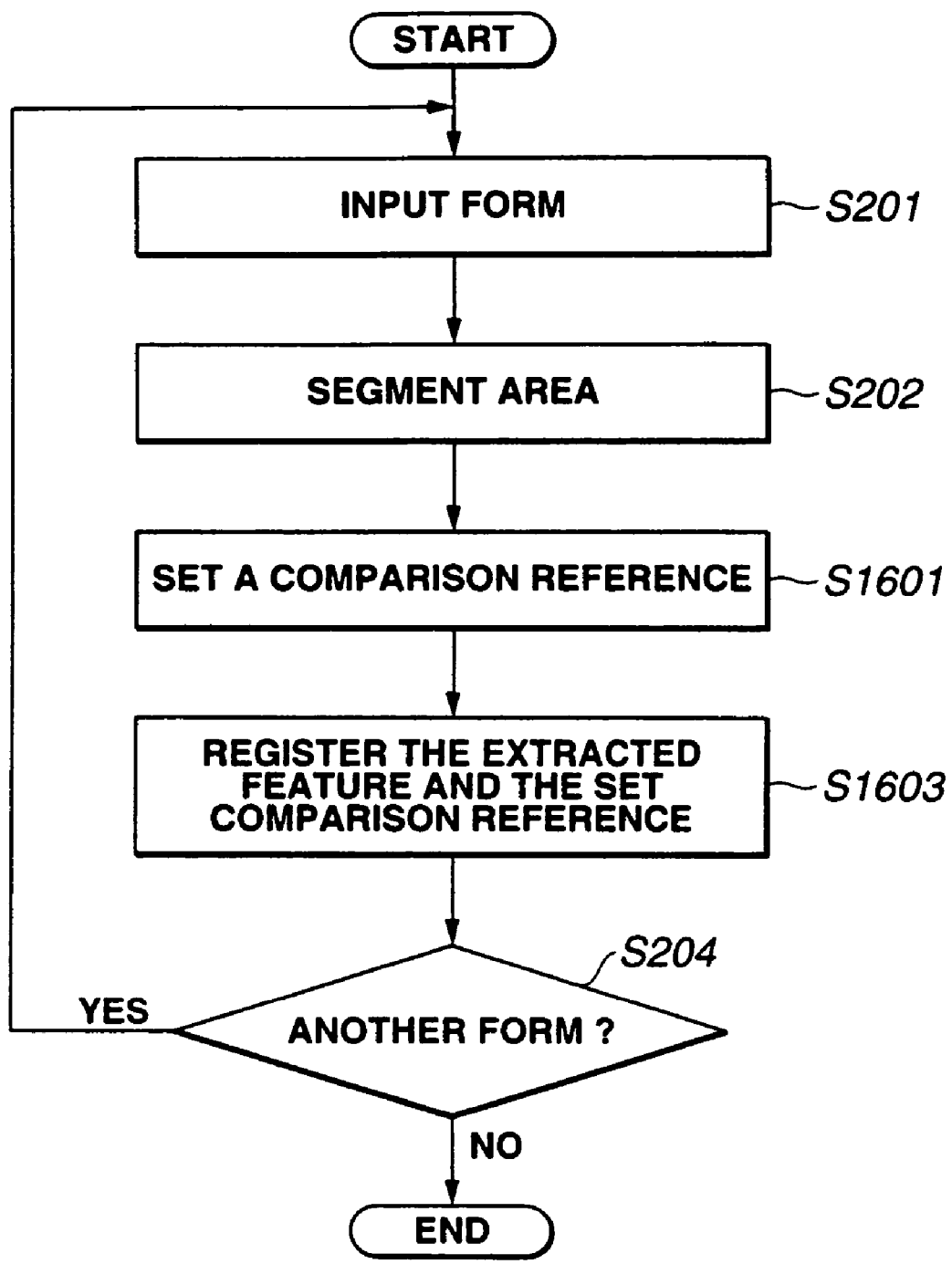
Figure 17:
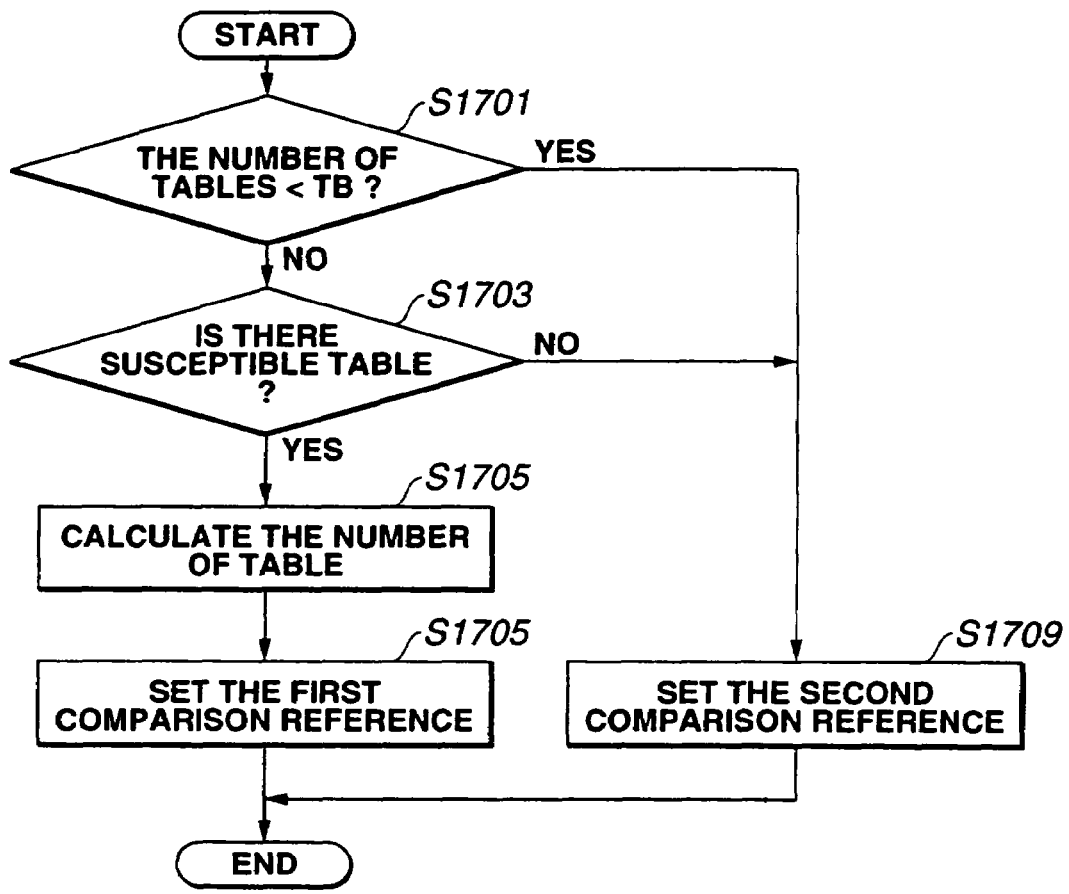
Figure 18:
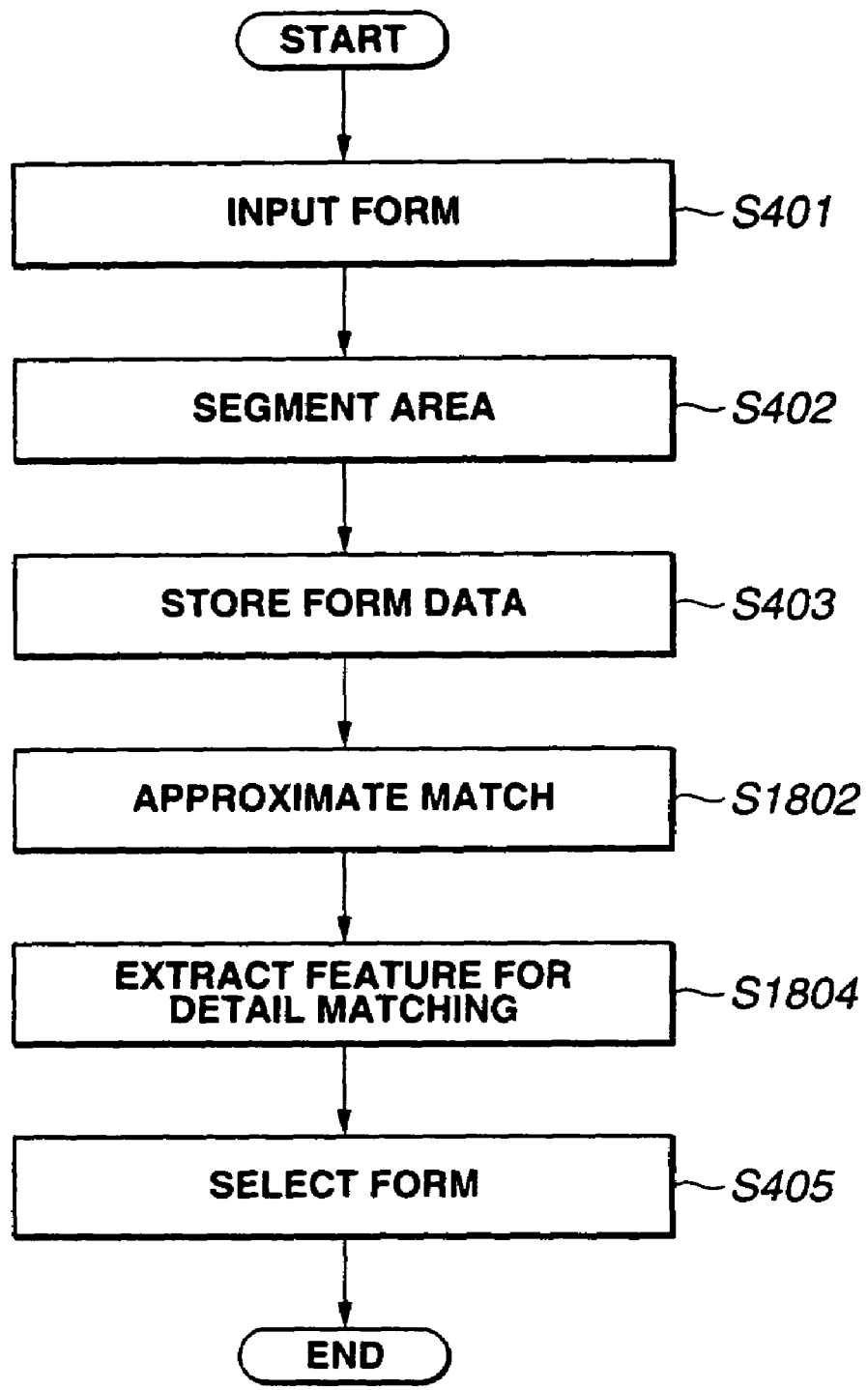
Figure 19:
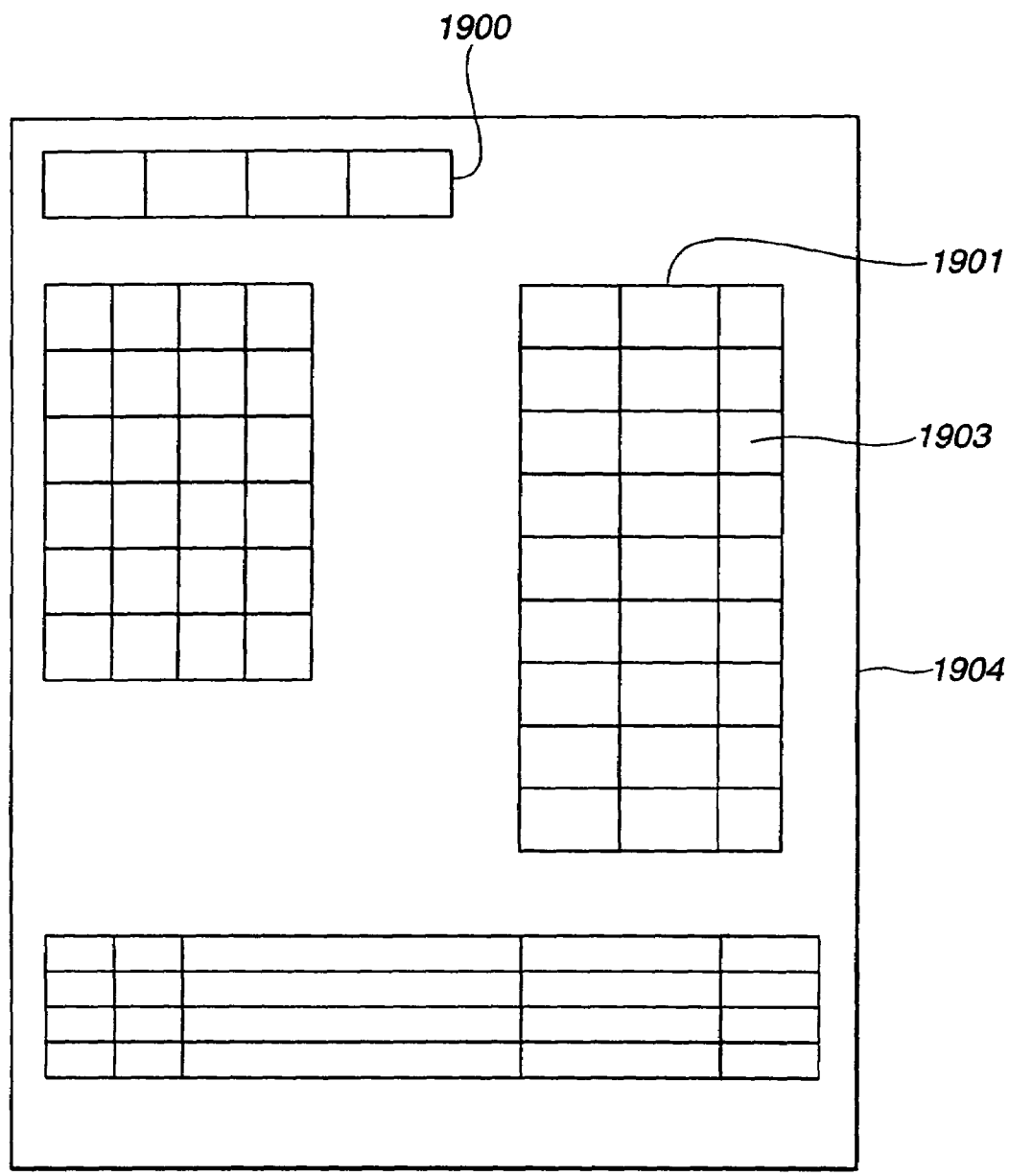
Figure 20:
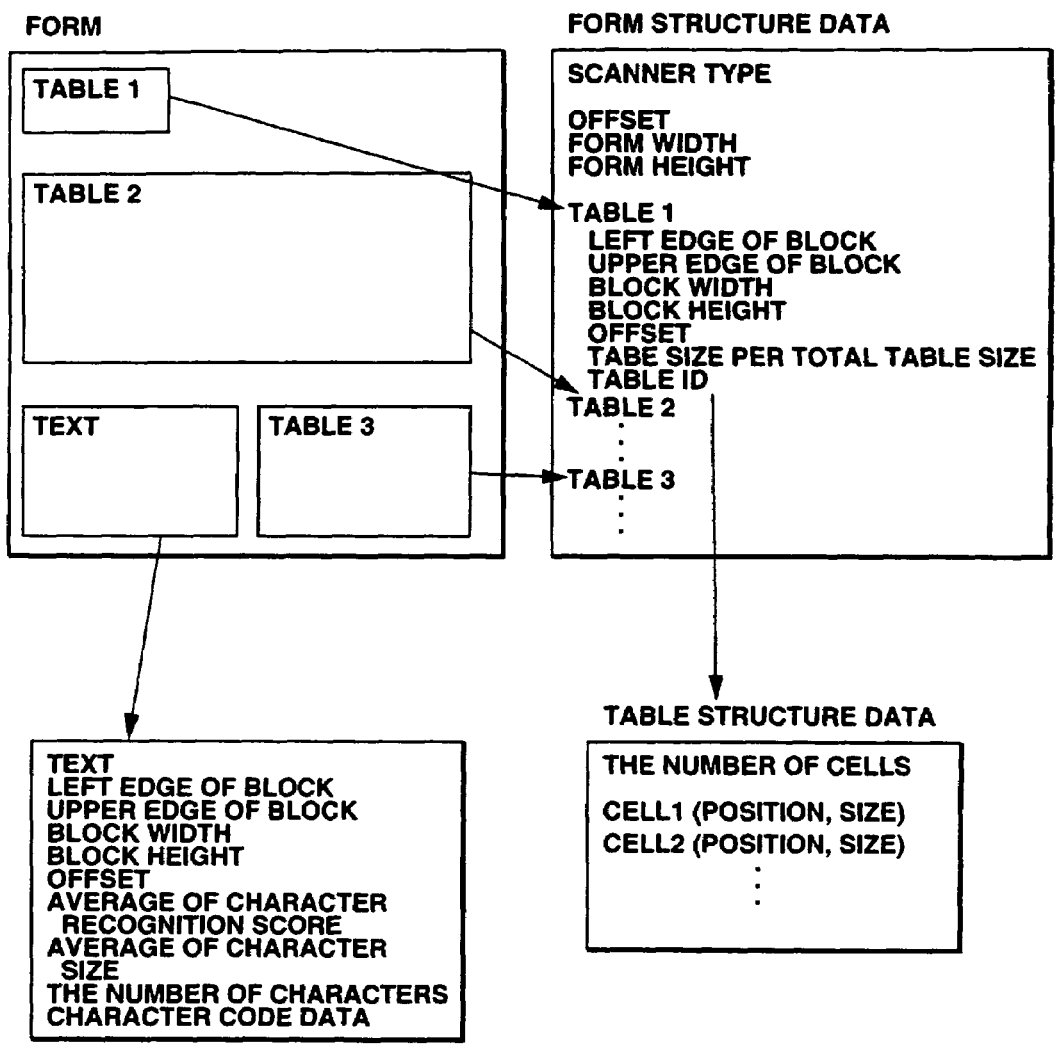
Figure 21:
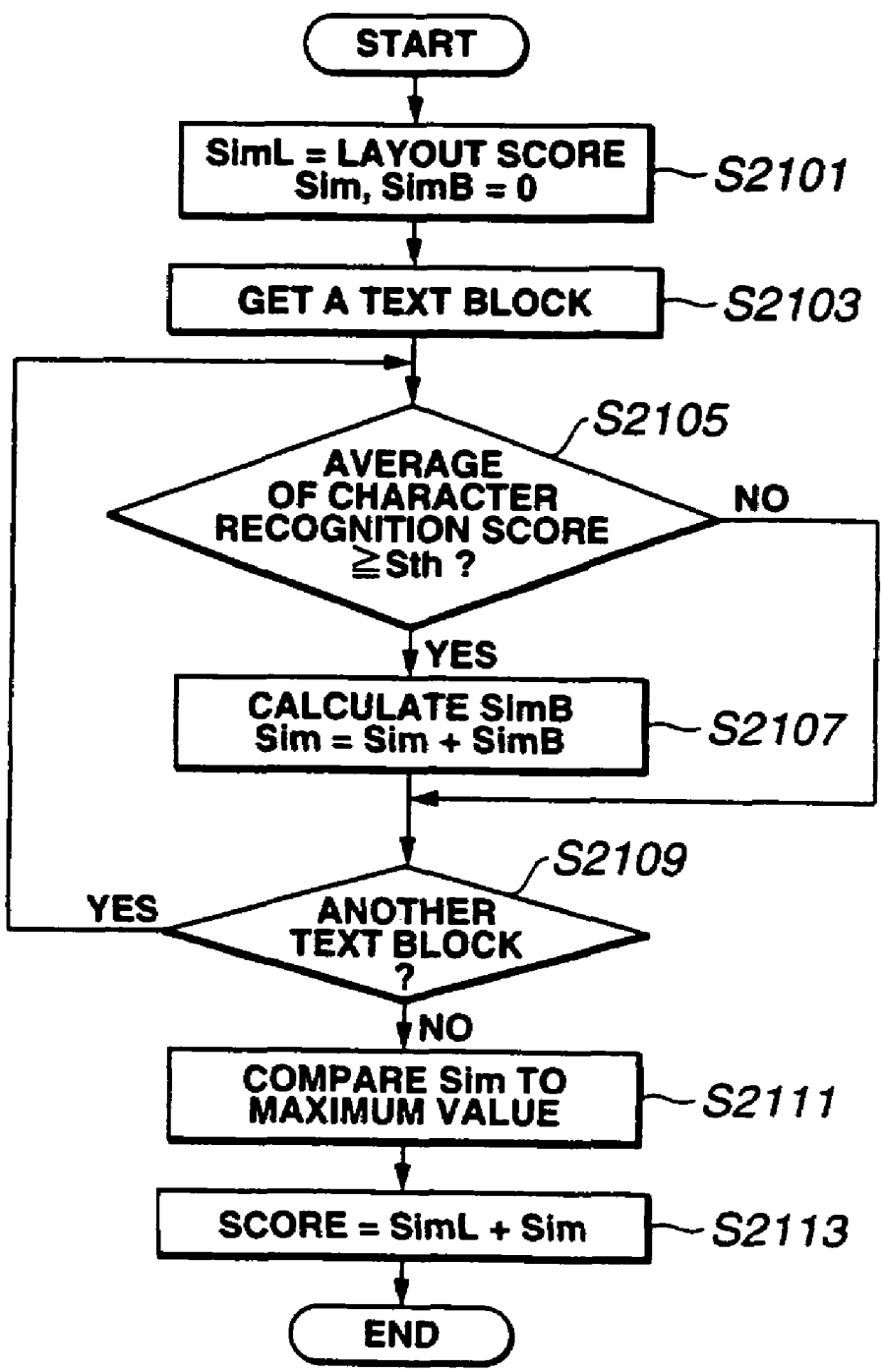
Figure 22:
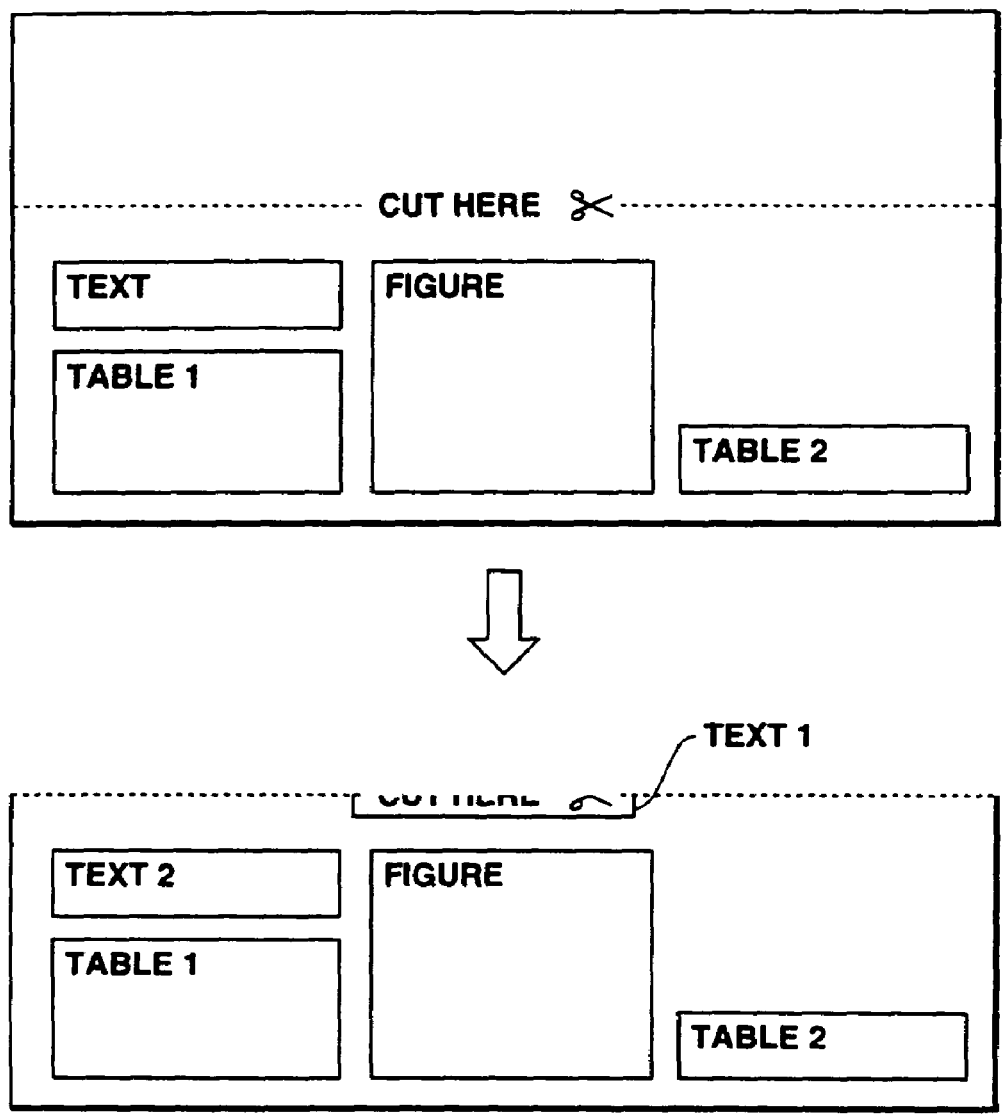
Figure 23:
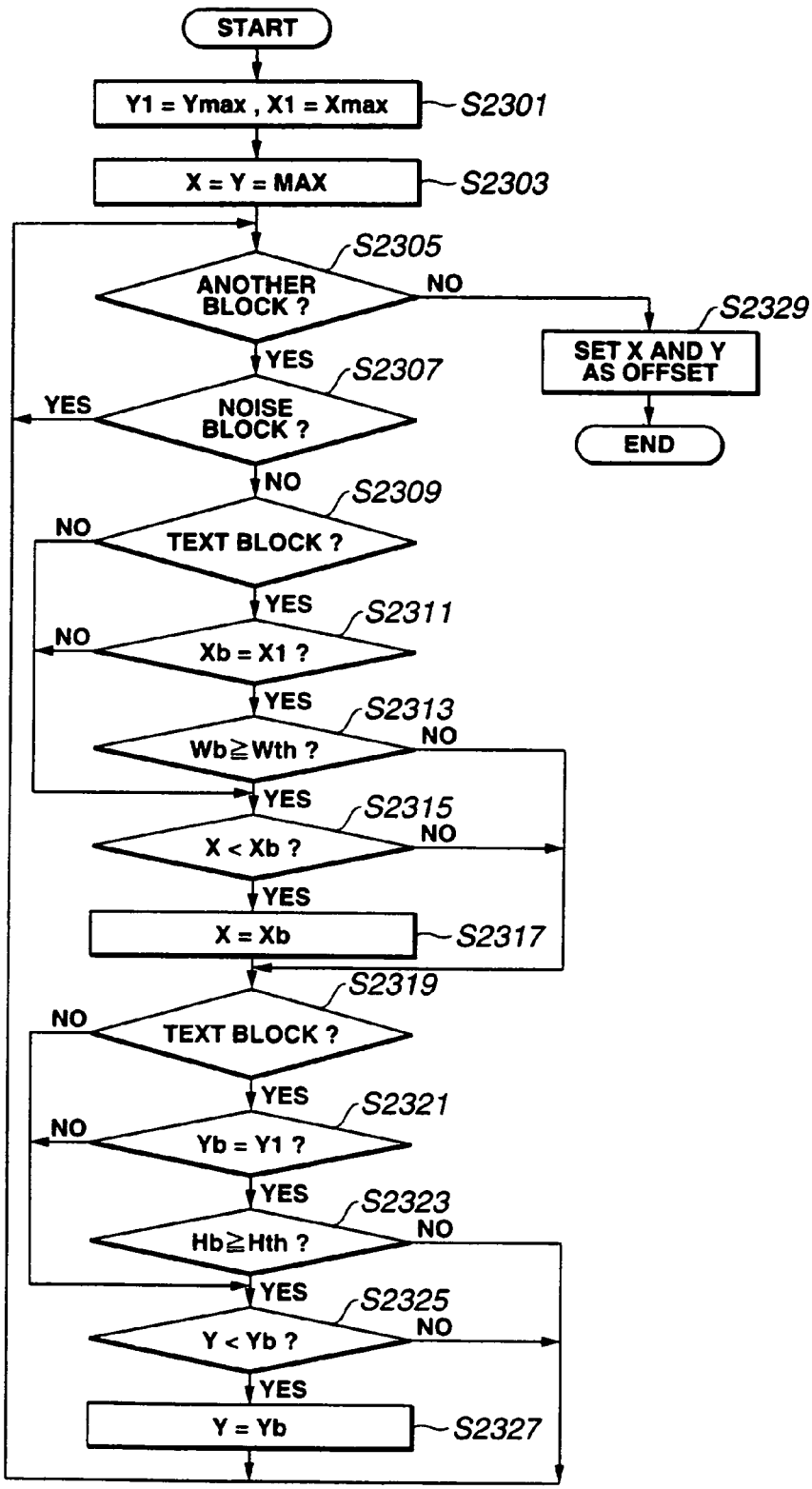

FIG. 6 A to C are diagrams showing examples of black and white block extraction;

FIGS. 7 A and B are diagrams showing examples of table and figure areas;

FIG. 8 A to C are diagrams showing examples of white block extraction;

FIG. 9 is a flowchart showing form search processing;

FIG. 10 is a flowchart showing score calculation processing;

FIG. 11 is a flowchart showing form search processing using input comparison reference;

FIG. 12 is a flowchart showing the rough matching processing of step S1103 of FIG. 11;

FIG. 13 is a flowchart showing form search processing including multistage approximate matching processing;

FIG. 14 is a flowchart showing the multistage approximate matching processing in step 1306 of FIG. 13;

FIG. 15 is an example of conditions used in the multistage approximate matching of FIG. 14;

FIG. 16 is a flowchart showing form registering processing including comparison reference setting processing;

FIG. 17 is a flowchart showing comparison reference setting processing;

FIG. 18 is a flowchart showing form search processing using the set comparison reference;

FIG. 19 is a schematic diagram of a business form which is subject to classification in accordance with the above embodiments;

FIG. 20 is a schematic diagram showing an input form including a text block;

FIG. 21 is a flowchart illustrating a further approximate matching process which includes scoring based on character recognition;

FIG. 22 is a schematic diagram illustrating a further embodiment in which incomplete characters or drawings resulting from a torn form are excluded from processing; and FIG. 23 is a flowchart illustrating a process used in setting an off-set for further processing to exclude the incomplete characters and drawings illustrated in FIG. 22.

Figure 1:
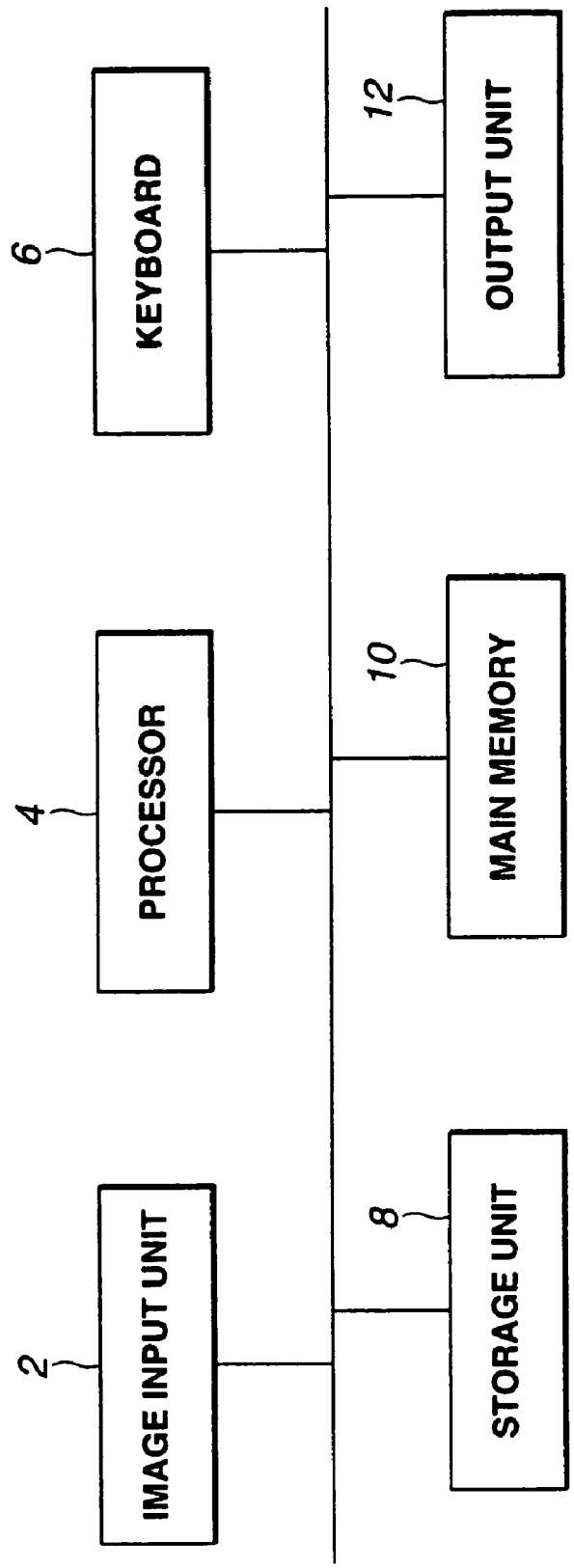
FIG. 1 is a schematic block diagram showing an arrangement of a form search apparatus according to the embodiment.

FIG. 1 shows a schematic block diagram showing an arrangement of a form classifying apparatus according to a preferred embodiment. In FIG. 1, an image read from the image input unit 2, for instance a scanner or camera etc., is binarised by a general method in the image input unit 2 and sent to processor 4 as digital image data. Forms to be registered as template forms are input from the same images input unit 2 in this embodiment. Processor 4 extracts blocks identified as extracted areas having attributes such as table, text, figure etc. from the digital image. For the extraction, processor 4 uses a general image feature extraction method such as a method using a histogram of black dots. If the extracted block is a table block, namely the block has an attribute of a table, the processor 4 extracts detail features of tables and the number of tables as shape feature data by using a ruled line trace method. Processor 4 transforms the image data in the extracted block to character codes by using a character recognition method if the block is a text block. The obtained information of each block such as shape feature and text data is stored in a computer memory 10 such as RAM or a storage unit 8 such as floppy disk.

Processor 4 receives registration information for template forms which is input by keyboard 6 using commands such as search, select etc., and executes the search processing described below by using shape features of the forms and a multistage search rule described below etc. stored in storage unit 8 and outputs a result of the search processing to an output unit 12 such as a display or printer. Processing, including processing shown by flowcharts described later, is executed by the processor 4 on the basis of a control program stored in the memory 10. The control program may be input in the memory 10 from a medium such as floppy disk and CD-ROM previously stored in the storage unit 8. Alternatively the control program may be stored in another apparatus connected via a communication network. The units shown in FIG. 1 can be comprised in a special form processing apparatus but may alternatively be realized by a general purpose computer connected with the image input unit 2.

Figure 2:
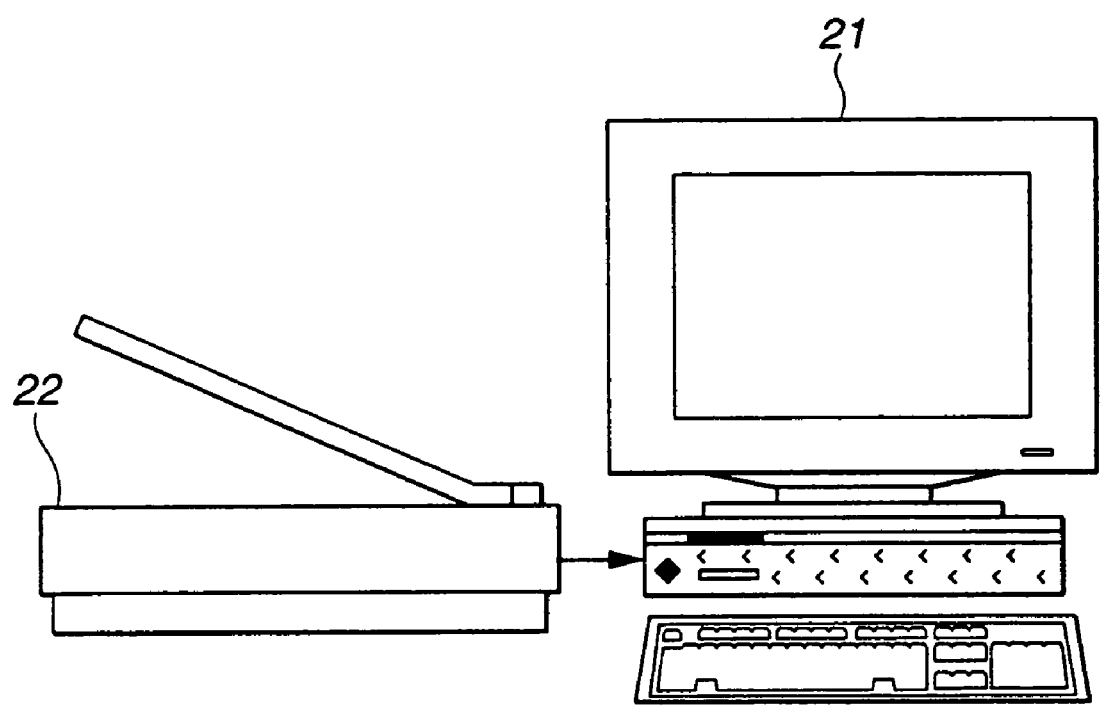
FIG. 2 is a system according to the embodiment.

The form classifying apparatus is realized by a system as shown in FIG. 2. Computer 21 executes processing for form classification. Scanner 22 optically reads the image of an input paper form, digitizes the image of the form and sends the resulting image data to the computer 21.

FIG. 19 illustrates an example of a business form 1940 having a number of tables such as 1900 and 1901. Tables contain a number of cells 1903 and, as illustrated in FIG. 19, the tables can take a variety of shapes and have a variety of a number of cells.

Figure 3:
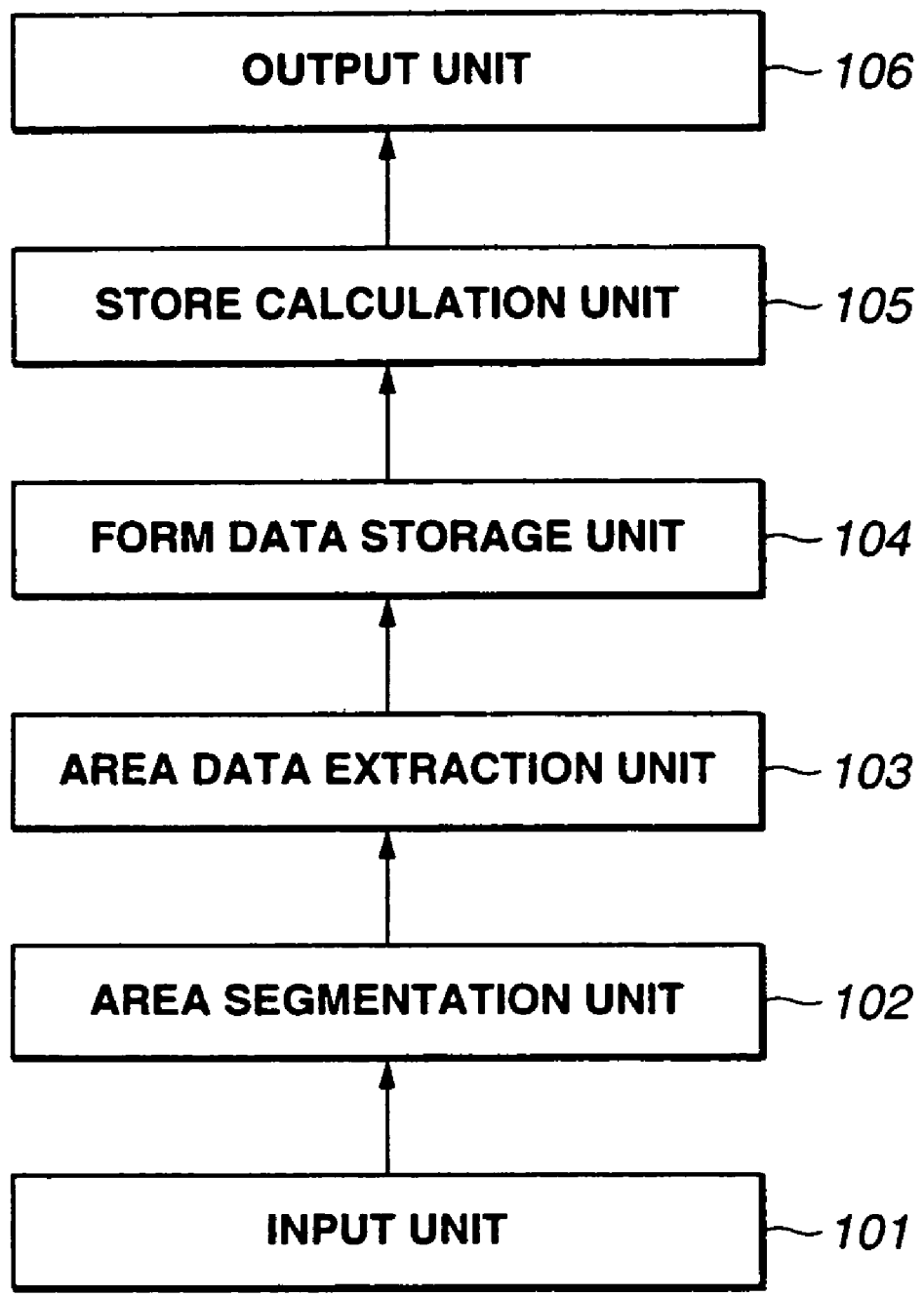
FIG. 3 is a functional block diagram showing a form search apparatus according to the embodiment.

FIG. 3 is a functional block diagram showing a form classifying apparatus according to the embodiment. Input unit 1 uses an image input device such as scanner and camera etc. for inputting image data representative of a form in written or printed on a medium such as paper. Area segmentation unit 102 segments areas such as text, figure, table, frame, line etc. from the image data. Area data extraction unit 103 extracts information which is necessary for later processing for each area extracted in area segmentation unit 102. Form data storage unit 104 stores form data comprising extracted area data and other data extracted from registered forms which are classified and stored in a memory. Score calculation unit 105 calculates scores showing a similarity between registered template forms and the input form. Output unit 106 outputs a search result on the basis of the calculation results from score calculation unit 105.

The processing executed by the form classifying apparatus is described below. The apparatus according to this embodiment executes template form registration processing for registering template forms and form search processing for classifying input forms.

Figure 4:
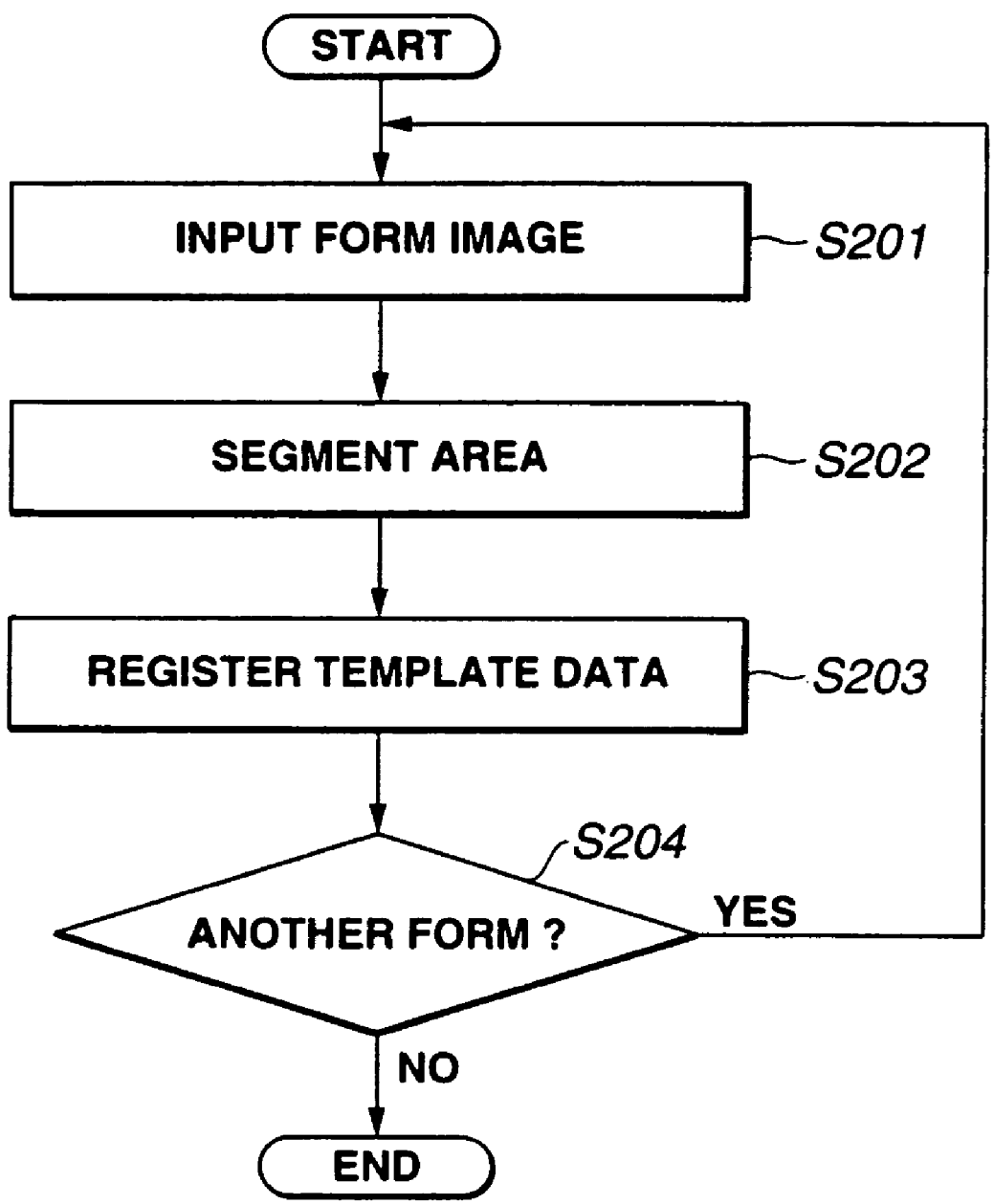
FIG. 4 is a flowchart showing a process of form registering.

FIG. 4 is a flowchart showing template form registration processing. Image input unit 2 inputs a template form which is to be registered and obtains digitized image data in step S201 and area segmentation unit 102 segments areas from the image data in step S202. Area data comprising information for each table area such as position, size and etc. and form data comprising the number of tables in the template form are registered in step S203. If it is determined in step S204 that there is another template form which should be registered the flow returns to step S201 and repeats steps S201 to S 204. If there is not, the registration processing ends. The determination in step S204 may be executed corresponding to a user designation corresponding to an output message or a determination whether or not there is a document waiting to be processed.

Figure 5:
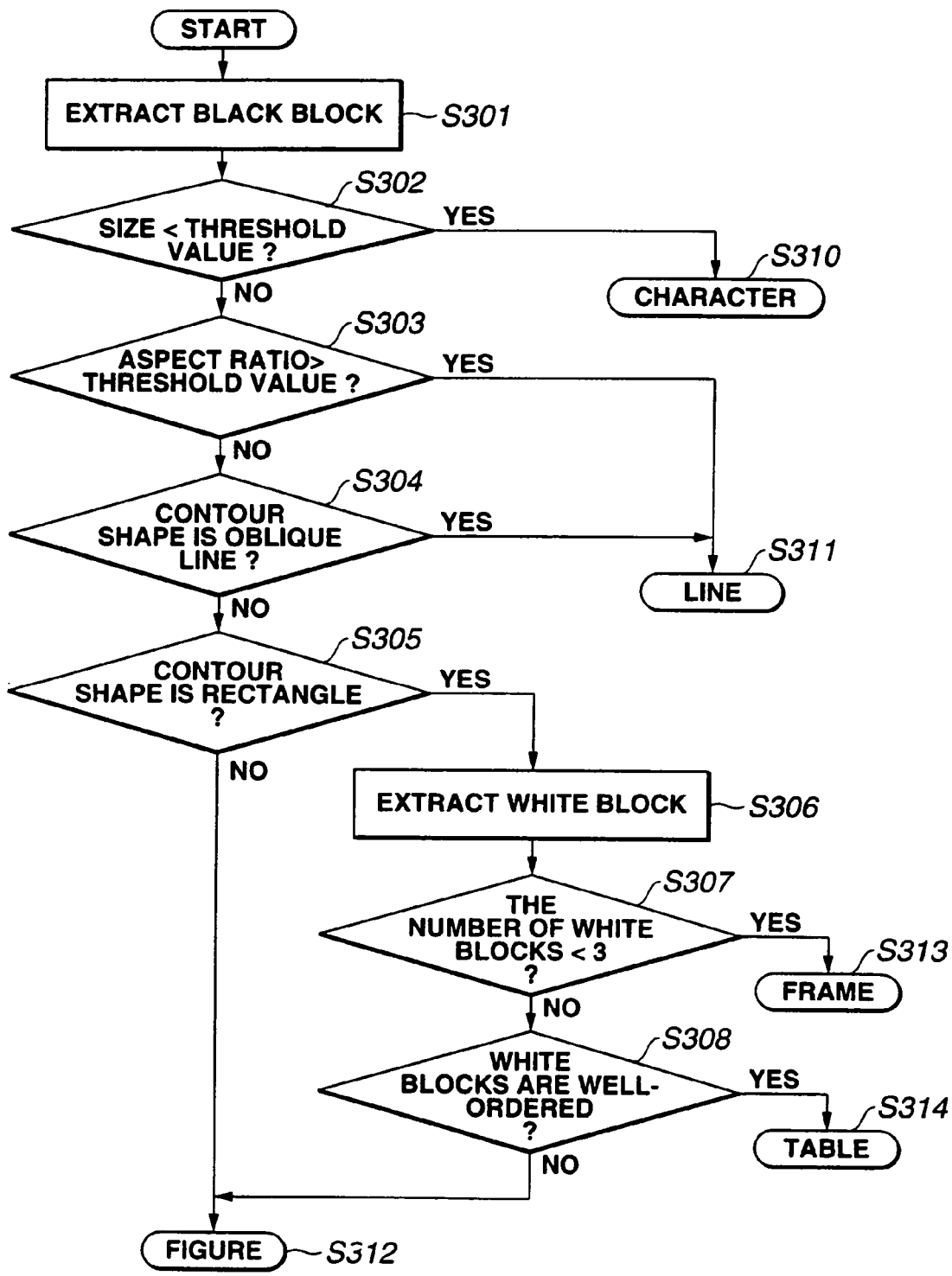
FIG. 5 is a flowchart showing area segment processing in step S202 of FIG. 4.

FIG. 5 is a flowchart showing in detail processing of the area segment processing in step S202.

In step S301, all black blocks are extracted from the image input in step S201. Each black block defines an area surrounding contiguous black pixels. As shown in FIG. 6 (A), if one of the eight pixels b surrounding one black pixel a in the horizontal, vertical and oblique direction is black, the black pixels a and b are determined as contiguous pixels. The contiguous determination is repeated to other pixels surrounding each new black pixel. In FIG. 6B, reference 602 shows an example of contiguous black pixels and rectangle 603 in dotted lines shows an example of a bounding box used to judge the size of the block.

The size of a black block is compared with a threshold value for character determination in step S302. A black block having a size which is equal to or smaller than the threshold value is determined to be a character block containing a character in step S310. If it is not, the flow shifts to step S303. The threshold value for character determination is determined for each image by image analysis. In each case, an expected maximum height and width of black block obtained by statistical analysis of a number of black blocks from the image, or enlarged one which is calculated by multiplying the maximum height and width by predetermined value, for instance 1.1, is used for the threshold value. Alternatively, the common value for a number of images stored in memory may be used as the threshold value for character determination.

The aspect ratio which is a ratio of height and width of a black block is compared with a threshold value for line determination in step S303. A black block having the ratio which is equal to or greater than the threshold value is determined to be a line block in step S311. If it is not, the flow shifts to step S304.

In step S304, a black block having a contour shape which is oblique is identified. The identified black block is determined to be a line block in step S311. If it does not, the flow shifts to step S305.

In step S305, a black block having a contour shape which is rectangular is identified. The flow shifts to step S306 for the identified rectangular black block and to step S312 otherwise. The black block is identified as a rectangle if the contour of the black block is determined to be made from four linear sides and if the two set of opposite sides are the same length. The determination allows for tolerances such as an inclination, a curvature or a length difference of line in a predetermined range stored in memory. A black block identified not to be a rectangle in step S305 is determined to be a figure block in step S312.

In step S306, a white block is extracted from within the black block identified to be a rectangular block in step S305. The white block defines an area surrounding a group of contiguous white pixels. As shown in FIG. 6 (A), if one of the eight pixels surrounding one white pixel in the horizontal, vertical and oblique directions is white, the white pixels are determined to be contiguous pixels. The contiguous determination is repeated to other pixels surrounding the new white pixel. The size of a white block is judged using a rectangular bounding box surrounding the contiguous white pixels. In FIG. 6 (C), figure 604 shows an example of contiguous white pixels and dotted rectangle 605 shows an example of a bounding box surrounding the white block.

The number of white blocks extracted from one black block and the total size of white blocks are compared with a threshold value in step S307. The black block is determined to be a frame block if the number is equal with or smaller than the threshold value and the total size of white blocks is equal or bigger than the threshold value which is defined by multiplying the size of the black block by a predetermined rate in step S314. The predetermined rate is a threshold value for frame determination stored in memory and may be 95 percent for example. The comparison determines whether white blocks fill the black block. FIG. 8 (A) shows an example of some black block whose attribute is determined to be a frame.

It is determined whether white blocks are well-ordered in the horizontal direction in step S308. If so, the black block is determined to be a table block in step S314. If it is not, the flow shifts to step S312. FIG. 8 (B) shows an example of a black block whose attribute is determined to be a table since the white blocks are well-ordered. FIG. 8 (C) shows an example of a black block whose attribute is determined to be a figure since the number of white blocks is bigger than three but they are not well-ordered.

The positions of black blocks and white blocks and an attribute of each block are stored in memory in steps S310 to S314.

The form search processing shown in flowchart of FIG. 9 is described below. The form search process is a process of searching for a template form which has features being similar to the form input in step S401 from a number of template forms registered in the template form registration process.

The image data of the input form for the search is input by input unit 101 in step S401. In step S402, an area is segmented from the image input by the area segmentation unit 102 in step S401. The area segmentation and the processing shown by flowchart of FIG. 5 are the same, the processing executing image data analyzing, black block extraction, attribute determination for each black block such as text, figure, table, frame and line and result storing.

In step S404, table area data registered in the template form registration processing is compared with the segmented area data stored in step S403 and the score calculation unit calculates a score representing the degree of matching between the input form and the registered template form. The score calculation method is shown in the flowchart of FIG. 10.

The output unit 106 outputs a classification corresponding to a registered template form having the highest score and which is identified by comparison of a number of scores obtained in step S404. The output unit 106 determines the identified template form belonging to the same group as the input form and stores image data for all input forms in groups corresponding to the respective identified template forms. Alternatively, output unit 106 displays or prints the classification of the identified form for notifying an operator. For notifying the operator, output unit 106 may output details of a number of registered template forms having the highest score to enable the operator to select whichever one of them is judged to be appropriate. A predetermined number of the output registered template forms having the highest score may be selected for display or alternatively those registered forms having a score higher than a predetermined threshold value may be selected.

The score calculation method shown in flowchart of FIG. 10 is described below. Score S is set to 0 in step S501. Counter TABLE n is set to 1 in step S502. The counter TABLE n represents a table area of the template form for executing the process of steps S503 to S523, which is a process for calculating a score, the process being repeated for each value of n if there are a number of table areas in a template form.

Counter t is set to 1 in step S503. The counter t represents a table area of the input form during execution of the process of steps S504 to S506, which is a process for determining whether a table in a template form matches a table in the input form, the process being repeated for each value of t if there are a number of table areas in the input form.

At step S504, it is determined whether the $t^{th}$ table has been matched previously by referring to a TABLE t flag set in step S506. The determination is realized by identifying the flag which shows if the $t^{th}$ table is related to some table in a template form. If the flag is ON the $t^{th}$ table is related to some table in the template form and if it is not, the tables are not related. If the TABLE t flag is ON the flow shifts to step S508.

It is determined whether TABLE n in the template form and TABLE t in the input form are the same on the basis of the comparison of the position and size of each table. The determination may be allowed to include differences between the tables since it is expected that there is a degree of skew in the input of the form when scanned. If it is determined that TABLE n in the registered form and TABLE t in the input form are the same, the flow shifts to step S506 where TABLE t flag is set to ON and the number is stored. In step S507, the score S is incremented by one and the flow shifts to step S524 where the comparison process is shifted to the next table in the template form.

In step S508, the counter t is incremented by one to select the next table in the input form. The flow shifts to step S509 where it is determined whether counter t is equal to or smaller than the number of tables in the input form, which is stored in memory in step S403. It is determined whether comparison of all tables in the input form with TABLE n is complete and if it is not the flow shifts to step S510. This shift means comparison of TABLE n with an area having one attribute in the input area is completed and therefore the comparison with TABLE n can shift to an area having another attribute in input area. If the result is yes in step S509, the flow returns to step S504 and the next comparison between TABLE t and TABLE n starts.

The counter f is set to 1 in step S510. The counter f counts a frame area of the input form to execute the process of steps S511 to S514, which is a process for determining whether a table in a template form matches a frame in the input form, repeated for each frame if there are a number of frame area in an input form.

For FRAME f, which defines the $f^{th}$ frame in the input form, it is determined whether the frame has previously been matched in step S512. The determination is realized by identifying the flag which shows the frame is related to some table in a template form. If the flag is ON the frame is related to some table and if it is not, the frames are not related. If FRAME f flag is ON the flow shifts to step S515.

It is determined whether TABLE n in the template form and FRAME f in the input form are the same on the basis of the comparison of the position and size of each frame. The determination may be allowed to include difference between the areas since it expected that there is skew in the scanned input. If it is determined that TABLE n in the template form and FRAME f in the input form are the same, the flow shifts to step S513 where FRAME f flag is set to ON and the number is stored. In step S514, the score S is incremented by one and the flow shifts to step S524 where the comparison process is shifted to the next table in the template form.

In step S515, the counter f is incremented by one to select the next frame in the input form. The flow shifts to step S516 where it is determined whether the counter f is equal to or smaller than the number of frames in the input form, which is stored in memory in step S403. It is determined if all frames in input form have been compared with TABLE n and, if not the flow shifts to step S517. This shift means comparison of TABLE n with an area having one attribute in input area is completed and therefore the TABLE n can shift to an area having another attribute in input area for comparison. If the answer is yes in step S516, the flow returns to step S511 and next comparison between TABLE n and FRAME f starts.

The counter P is set to 1 in step S517. The counter P counts a figure area of input form to execute the process of steps S518 to S521, which is a process for determining whether a table in a template form matches a figure in the input form, for each figure if there are a number of figure area in the input form.

Flag FIGURE p, which defines the $p^{th}$ figure in form, denotes whether the figure has completed a process of step S519. The determination is realized by identifying the flag which shows the figure is related to some table in a template form. If the flag is ON the figure is related to some table and if it is not, the figures are not related. If the FIGURE p flag is ON the flow shifts to step S522.

It is determined whether TABLE n in the registered form and FIGURE p in the input form are the same on the basis of the comparison of the position and size of each area. The determination may be allowed to include a difference between the areas since it is expected that there is skew in the scanned input. If it is determined that TABLE n in the template form and FIGURE p in input form are the same, the flow shifts to step S520 where FIGURE p flag is set ON and the number n is stored. In step S521, the score S is incremented by one and the flow shifts to step S524 where the comparison process is shifted to the next table in the template form.

In step S522, counter P is incremented by one to select the next table in the input form. The flow shifts to step S523 where it is determined whether counter P is equal to or smaller than the number of figures in the input form, which is stored in memory in step S403. It is determined whether all tables in the input form have been compared with TABLE n and if so the flow shifts to step S524. This shift means comparison of the n tables with an area having all attributes, which should be compared in input area has been completed and therefore the TABLE n has finished the comparison process. If the answer is yes in step S523, the flow returns to step S518 and the next comparison between FIGURE p and TABLE n starts.

Counter n is incremented by one in step S524 to shift the table to be compared with each area in the input form to the next one in the template form.

In step S525, it is determined whether the counter n is equal to or smaller than the number of tables in the template form. It is determined whether all tables in the registered form have been compared with each area in the input form. If it is not, the score S is divided by the total number of table areas in the template form and the result is stored as a score between the input form input in step S401 and the template form with identification information of the template form in memory in step S526.

The process shown in flowchart of FIG. 10 is executed to each template form stored in memory. Further, approximate matching may be executed between steps S403 and S404 to reduce the number of score calculations shown in FIG. 10. The approximate matching process comprises preselecting a set of template registered forms to be subject to the score calculation process and is described in detail below.

The risk that a similar form is not correctly classified is reduced even if the result of attribute identification for the input form is incorrect since tables of the template form are compared not only with the extracted areas identified as tables but also with areas identified as having other attributes when a score is calculated. This process enables higher accuracy to be obtained in form similarity determination since inaccuracy of attribute identification is compensated in the score calculation step.

The score S is here incremented equally by one in steps S507, S514 and S521 but the score S may be incremented by a weighted value unique to each step. For instance, the value may be one when the table in the template form and the table in the input form are determined to be the same and the value may be 0.5 when table in the template form and the frame or figure in the input form are determined to match. Such weighted values may be stored as a truth table showing a relationship between the attributes of the template form and the input form in memory.

Only table areas which are designated by the counter are executed in the process of flowchart of FIG. 10 but areas having other attributes may be executed in the process.

Other blocks having other attributes shown in FIG. 10 may be used in this comparison. Alternatively, the attributes of blocks being compared may be more limited than attributes shown in FIG. 10. The attributes of blocks being compared may be predetermined before executing the process of step S404, may be designated by the operator directly or may be selected in dependence upon the setting of a mode of operation.

An example of approximate matching to select a template form for inclusion in the score calculation process of step S404 from memory is described below.

The flowchart of FIG. 11 shows a modification to the process of FIG. 9 in which is added a comparison reference input step S1101 and an approximate matching step S1103.

The comparison reference input in step S1101 is a reference value used in approximate matching which reduces the number of template forms submitted to the comparison process. A percentage value is set to define a selection criteria in terms of the allowed difference between the number of cells in the selected table of input form and the number of cells in the selected table of template form. The template form is not submitted to the comparison process if the percentage difference is bigger than the set value. The value of the comparison reference can be controlled during the approximate matching process. Generally, 30 percent may be preferred for the value of the comparison reference. The value may be stored as a predetermined default value, or may be input by the operator directly, or may be changed in dependence on a mode selected by the user to define a recognition accuracy.

The processes of steps S401 to S403 are the same as the processes described for the same steps in FIG. 9.

The approximate matching step comprises a score calculation on the basis of the result of comparison reference input in step S1101 and is executed in step S1103. The approximate matching process is shown in detail in the flowchart of FIG. 12 which is described below.

In step S404 of FIG. 11, the score calculation is only executed for forms selected in the approximate matching in step S1103.

In step S1201, the number of tables of the input form and the numbers of cells in the largest table of the input form are obtained from form data stored in step S403. Counter j which is a counter for selecting all template forms one by one, is set to 1 in step S1202. All template forms are provided to the process of steps S1204 to S1210.

In step S1204, the number of tables of the $j^{th}$ template form and the numbers of cells in the largest table of the template form are obtained from memory and stored in working memory. The number of tables of the input form obtained in step S1201 is compared with the number of tables of the $j^{th}$ registered form obtained in step S1204 and it is determined whether they are the same number. The flow shifts to the step S1208 if the number is the same, and the flow shifts to the step S1212 if it is not. In step S1208, the numbers of cells in the largest table of the input form obtained in step S1201 is compared with the numbers of cells in the largest table of the $j^{th}$ template form obtained in step S1204. In step S1208, if it is determined that the difference of the numbers compared in step S1208 is equal to or smaller than the comparison reference input in step S1101, the flow shifts to step S1210. The flow shifts to step S1212 if it is not.

In step S1210, the approximate match flag, which is set for each template form of the $j^{th}$ registered form is set to ON to provide the template form to the score calculation process in step S404. The template forms whose approximate match flag are ON is provided to the score calculation process and the template forms whose rough matched flag are OFF are not selected.

Counter j is incremented by one in step S1212 to shift the template form provided to the process of steps S1204 to S1210 to the next one. It is determined whether counter j is equal to or greater than the number of the template form in step S1214. The process of FIG. 12 ends if it is since the process to identify which of the template forms should be provided to the score calculation process is complete for all template forms. The flow shifts to the step S1204 if the answer is no in step S1214 and the process for next $j^{th}$ template form starts.

However, although the number of cells in the largest table is used for approximate matching in the flowchart of FIG. 12, other tables such as tables having second biggest size or a number of tables such as the predetermined number of tables determined in size order may be used for approximate matching. Alternatively, a number of extracted areas having other attributes or a combination of the numbers of areas having different attributes may be used for approximate matching.

FIG. 13 is a flowchart showing form search processing including multistage approximate matching processing.

The search mode, which can be a "high speed" search mode or a "normal" search mode, is selected by operator input in step S1300. The processes of steps of S401 to S403 are the same as the processes described in FIG. 9. In the approximate matching, the number of template forms being subjected to score calculation is reduced in multistages. Approximate matching is executed in step S1306 and the approximately matched forms are subjected to detailed matching in steps S404 and S405.

FIG. 14 is a flowchart showing multistage approximate matching processing in step 1306.

The search mode is determined in step S1400 by reading from memory a stored mode previously input in step S1300. The flow shifts to the step S1415 if the mode is determined as being a "fast" search mode and the flow shifts to the step S1401 if the mode is determined as being a "normal" search mode.

The process in the case of a "fast" search mode being determined is first described. A template form, which satisfies a first condition shown in FIG. 15 is selected from memory in step S1415 and a score for matching between the template form selected in step S1415 and the input form input in step S401 is calculated in step S1416. If a number of template forms are available in step S1415, the process of step S1416 is repeated for each template form. The score calculation is realized by adding a predetermined value for each determination that features of input form and template form, such as the number of areas having a predetermined attribute, position or size of those cells of tables having the maximum size, are the same. The score calculation steps S1420, S1424, S1402, S1404, and S1406 included in FIG. 14 are the same as the process of step S1416. In step S1418, it is determined whether there is a template form having a score which is equal to or greater than a first threshold value in the template forms being provided to the score calculation in step S1416. The first threshold value is determined before the start of the process of FIG. 14 and is stored in memory. It may be designated by the user or selected in dependence upon a selected mode such as recognition mode. Second, third and fourth threshold values are selected in the same way as the first threshold value. If it is determined from amongst all template forms for which the score is calculated that there is a score smaller than the first threshold value, the flow shifts to step S1428. If the answer is no in step S1418, the flow shifts to step S1419 and the next approximate matching stage starts.

A template form which satisfies a second condition shown in FIG. 15 is selected from memory in step S1419 and a score between the template form selected in step S1419 and the input form input in step S401 is calculated in step S1420. If a number of template forms are available in step S1419 the process of step S1420 is repeated for each template form. In step S1422, it is determined whether there is a template form having a score which is equal to or greater than a second threshold value in the template forms being provided to the score calculation in step S1420. If it is determined in step 1422 that all template forms for which a score is calculated have a score greater than or equal to the second threshold value, the flow shifts to step S1428. If not in step S1422, the flow shifts to step S1423 and the next approximate matching stage starts.

A flag may be set in step S1415 to indicate that the number of tables in the input form is determined to be the same as the number of tables in the template form. In step S1419, the determination of the difference of whether the number of cells in the largest table of the template form and the number of cells in the largest table of the input form is equal to or smaller than the threshold value only needs to be applied to the forms having the flag set to ON in step S1415. Therefore the number of template forms being provided to the second approximate matching stage is reduced and the speed of template matching process increases.

The flag showing the completion of the score determination process in data of the template form selected in step S1416 may be set to ON in step S1415. In step S1419, the provision of forms which have a flag set to ON in step S1415 to the approximate matching process in step S1419 is avoided. Therefore, the number of template forms to be provided to the second approximate matching process is reduced and the speed increases.

The flag showing the completion of the score determination process for template forms selected in step S1419 also may be set to ON in step S1419. Therefore, the number of template forms to be provided to the third approximate matching process in step S1423 is also reduced.

A template form which satisfies a third condition shown in FIG. 15 is selected from memory in step S1423. The third condition is used for selecting a template form which comprises the same number of extracted areas where each area comprises one of a table, frame, figure and line. A score between the template form selected in step S1423 and the input form input in step S401 is calculated in step S1424. If a number of template forms are available in step S1423, the process of step S1424 is repeated for each selected template form. In step S1426, it is determined whether there is a template form having a score which is equal to or greater than a third threshold value in the template forms being provided to the score calculation in step S1424. If it is determined amongst all template forms for which the score is calculated that there is a score greater than or equal to the third threshold value, the flow shifts to step S1428. If the answer is no in step S1426, the flow shifts to step S1430.

The scores of template forms selected in steps S1418, S1422 and S1426 are sorted in order of similarity in step S1428. The list of template forms is made on the basis of the sort results and output in step S1432. The list may comprise all template forms selected in steps S1418, S1422 and S1426, one form having the maximum score or the predetermined number of forms having the highest score.

The conditions listed in FIG. 15 are applied in a predetermined order in which the degree of approximation for the approximate matching progressively increases. Each condition therefore applies a preselection step. If in any one of these steps there is at least one match between a template form and the input form, the selected template forms matched in that step are then subject to the detailed comparison step without the need to perform the preselection steps of the further conditions. In this way, the process of score calculation and comparison is reduced to a minimum and the speed with which the process of input form classification can be carried out is increased.

Next, the process in the case in which "normal" search mode is determined is described. A template form which satisfies a first condition shown in FIG. 15 is selected from memory in step S1401 and a score between the template form selected in step S1401 and the input form input in step S401 is calculated in step S1402. If a number of template forms are available in step S1401, the process of step S1402 is repeated for each template form.

A template form, which satisfies a second condition shown in FIG. 15 is selected from memory in step S1403 and a score between the template form selected in step S1403 and the input form input in step S401 is calculated in step S1404. If a number of template forms are available in step S1403 the process of step S1404 is repeated for each template form.

A flag may be set ON in step S1401 to show that the number of tables in the template form is the same as the number of tables in the input form. Step S1402, determines the difference in the number of cells in the largest table of the template form and the number of cells in the largest table of input form and whether this difference is equal to or smaller than the threshold value. This step only needs to be applied to the forms having the flag set to ON in step S1401. Therefore the number of template forms being provided to the second approximate matching stage is reduced and the speed of approximate matching process increases.

A template form, which satisfies a third condition shown in FIG. 15, is selected from memory in step S1405 and a score between the template form selected in step S1405 and the input form input in step S401 is calculated in step S1406. If a number of template forms are available in step S1405 the process of step S1406 is repeated for each template form.

The scores of template forms selected in steps S1402, S1404 and S1406 are sorted in step S1408. It is determined whether there is a template form having a score which is equal to or greater than the fourth threshold value on the basis of the sort result in step S1410. If there is not, the flow shifts to step S1414 and output information is generated which shows that there is no similar form. If the answer is yes in step S1414, the flow shifts to step S1412 where the template form is selected and the flow shifts to step S1432.

Output information generated in steps S1414, S1430 and S1432 may be displayed or printed to be identified by the operator or sent to another program as a command to start another process using the output information.

The conditions used in multistage approximate matching may be variably defined, such as the desired number of conditions. The desired number of conditions are also defined such that the degree of approximation progressively increases so as to become less selective.

However, although the same conditions and same score calculation are used in both "fast" search mode and "normal" search mode in FIG. 14, different conditions and different score calculations may be used in dependence upon the selected mode. For instance, a score calculation giving priority to speed may be used for "normal" search mode. Alternatively, a matching method using some identification function may be used for score calculation.

Next, the process is described for determining a comparison reference on the basis of the features extracted from a scanned form which is input during a training phase and for registering data for each form which is input during this training phase such that the template forms can serve as templates for matching input forms. The comparison reference is used as a comparison condition in a comparison process which comprises an unknown form input process and a form identification process. It is determined to be suitable for the quality and type of each form image.

The flowchart of FIG. 16 shows a process for registering a template form. The comparison reference which is suitable for each registered template form is obtained and stored in this process. The process of steps S201, S202 and S204 is the same as the process described in FIG. 4. In step S1601, the comparison reference is set on the basis of a feature of the form to be registered obtained by area segmentation in step S202. The process to set the comparison reference is shown in detail in the flowchart of FIG. 16 and described below. The comparison reference relates to table features such as a distance between cell centers, the number of cells and the number of tables.

In step S1603, the feature such as position, size and the number of tables are stored to storage unit 8 via memory 10 with the comparison reference set in step S1601.

FIG. 17 is a flowchart showing comparison reference setting processing in step S1601 and described below.

The similarity determination for a form which comprises a number of tables which is smaller than a threshold value TB and a table which comprises a number of cells which is smaller than a threshold value SEL has the potential to cause an incorrect result. The incorrect result is caused by a form reading condition such as a defect in the form paper which is read or a defect in the scanning device. Such an incorrect result could also cause an error condition such that a correct template form is not selected in approximate matching. The flowchart of FIG. 16 comprises a process to set a comparison reference such that the determination of whether the template form is the same as the input form does not require a perfect match. The setting of a comparison reference is used for those forms which are susceptible to being determined incorrectly and allows the selection of a template form which is not completely similar in respect of the number of tables to an input form with which it is compared.

It is determined whether the number of tables is equal to or greater than the threshold value TB in step S1701. The flow shifts to step S1703 if it is not and shifts to step S1709 if it is. The threshold value TB may be previously stored in memory 10 or may be designated by the user. The threshold value may be the average number of tables typically comprising a form, the average number being determined for instance on the basis of experimentation. Using the value as a threshold value TB enables correct matching of forms having a number of tables which is smaller than average. If the average number is three in one experimentation, then the value 3 is available to use as the threshold value TB.

In step S1703, it is determined whether there is a table comprising cells whose number is smaller than the threshold value SEL on the basis of the result of area segmentation of step S202. The flow shifts to step S1705 if it is and shifts to step S1709 if it is not. The threshold value TB may be set about 2. Using the threshold value SEL enables detection of the table which has one cell in the direction of row or column, as a "susceptible" table in step S1703. Such susceptible tables are so called because they are susceptible to incorrect segmentation and identification when input forms are scanned, for example if one of the outer lines of the table is missing, faint or incomplete. In FIG. 19, table 1900 is an example of a susceptible table.

The flow shifts to step S1705 if it is determined that there is any such susceptible table.

The second comparison reference is set in step S1709. The comparison reference is used in a search process for a similar form image described below. The second comparison reference is set such that the number of tables in the template form is the same as the number of tables in an input form. This second comparison reference is stored in step S1603.

The number of susceptible tables detected in step S1703 is calculated in step S1705. The first comparison is set in step S1707. The first comparison reference requires the template form to satisfy a predetermined condition which can be met even if the number of tables comprised in the template form is not the same as that of the input form. The first comparison reference is stored in step S1603.

The first comparison reference allows more candidate forms than the second one. The predetermined condition is met if the difference in the number of tables in the input form and the template form is less than the number of susceptible tables calculated in step S1705. If the condition is met, the reference table is selected as a candidate of a similar form. The number of susceptible tables is also stored in storage unit 8 as feature data in step S1603.

A number of predetermined comparison references may be stored in the main memory 10 before the process and a comparison reference identification information to identify one of stored comparison reference may be stored with form feature data in step S1603. To set a comparison reference being suitable for each form condition depending on tables comprised in the form, which includes the numbers of tables and cells, as the flowchart of FIG. 17 shows enables realization of accurate and efficient form recognition.

A number of threshold values TB1 TB2 etc. may be used in a comparison of step S1701. The threshold values are stored with an order of comparison use in memory 10 and each threshold value is read out in the order and used in comparison. Alternatively, a look-up table stores threshold values to be used in the comparison step S1701. In this case, a comparison reference relying on each threshold value is set in step S1709.

Structure information such as size of table, an arrangement of cells in a table and an attribute of cells such as size or separation may be used as a determination reference in a determination of whether the table is a susceptible table in step S1703. Multistage determination references and a combination of the determination references may be used for a multistage susceptible table determination.

FIG. 18 shows a flowchart of a form search process. The search process searches for a form which is similar to an unknown input form from a number of forms registered in storage unit 8 by the registration process shown in FIG. 16. The process, of steps S401 to S403 and S405 are the same as the steps described in FIG. 9.

The step S1802 is an approximate matching step. The number of tables in the input form stored in step S403 is compared with the number of tables in the template forms and template forms are selected on the basis of the comparison reference stored in storage unit 8 in step S1603. The template forms selected in the approximate matching step have a higher probability of matching with the input form.

Table structure data and character code in each cell are then extracted from the selected registered form as features for detailed matching.

Next, a further modified approximate matching process is described, the process additionally using information about text blocks in the input form, the information comprising code data obtained from the input image by character recognition. FIG. 20 illustrates an input form in which there are three tables accompanied by a text block. Information relating to the tables is extracted and stored in form structure data including table structure data. Information relating to the text block is stored in text block structure data. For this process, as shown in FIG. 20, characters in each extracted text block are subjected to character recognition processing and the result of the character recognition and the data of the text block are stored in step S402 as text block structure data.

An approximate matching process using information about the code data stored in text block structure data may be executed within each of steps S1103 of FIG. 11, S1306 of FIG. 13 and S1802 of FIG. 18. The process is used for reducing the number of candidate forms by selecting forms from candidate forms using the approximate matching process. FIG. 21 is a flowchart showing a score calculation process using the code data.

In step S2101, a layout score obtained in a previously executed approximate matching process using table data is stored as a parameter SimL and parameters Sim representing a total character score and SimB representing a character score in a current text block are set to zero. Data for a text block at a position designated on the basis of the text block structure data of the input form is retrieved from the registered form.

Each character in a text block is compared with a dictionary and a recognition result stored, both as the dictionary character recognised and a numerical recognition score representing the degree of match. An average of the recognition scores for all of the characters is then computed. This process is also carried out in respect of the characters in the text block of the registered form and a corresponding average recognition score also computed.

The averages of character recognition score for each of the input form and registered form are compared at step S2105 with a threshold value Sth. The threshold value Sth is an experimentally determined value for distinguishing between printed characters and handwritten characters. The comparison process in step S2105 allows selection of a text block comprising printed characters for an approximate matching process using code data. The flow shifts to step S2107 if both of the averages of recognition score are greater than or equal to $S^{th}$, i.e. Yes is obtained in step S2105, and the flow shifts to step S2109 if No is obtained in step S2105.

In step S2107, the character score SimB is calculated on the basis of character code data recognized in the text block selected in step S2105. The character score calculation comprises a step of comparing the recognised characters in the text block structure data of the input form and the recognised characters in the text block structure data of the registered form. A predetermined value is added to the character score SimB if the compared recognised characters data are the same and a predetermined value is subtracted from the character score SimB if the compared recognised characters data are different.

The predetermined value is selected such that it represents a percentage of the total possible character score available for a given text block, i.e. the total available score corresponding to 100%.

The value added and subtracted may be weighted on the basis of each character size or the number of characters in each block.

It is determined in step S2109 whether there is another text block in the input form to be subject to the process of steps S2103 to S2107. The flow returns to step S2103 if Yes is obtained in step S2109 and the flow shifts to step S2111 if No is obtained in step S2109. Character score SimB of a current text block is added to a running total provided by character score Sim in step S2107. If the process in step S2103 to S2107 is repeated since it determined another text block is provided to the process, then SimB is reset to zero for the next text block.

Character score Sim is compared to a predetermined maximum value in step S2111. The value of character score Sim is reduced to the predetermined maximum value if the character score Sim is bigger than the predetermined maximum value. The value of character score Sim is unchanged if the value of character score Sim is equal to or smaller than the maximum value. The maximum value is a value for limiting the value of Sim in a predetermined range.

A text block which is not selected in step S2105 may be used as a penalty in character score calculation. For this, a negative penalty value is calculated on the basis of the number of characters comprised in the text block and a predetermined penalty coefficient and the negative penalty value is added to the character score SimB. The character score Sim is therefore decreased after the penalty value is added.

As a further alternative, instead of using average values in step S2105 to determine whether a text block is handwritten or printed, it is possible to check individual characters to determine whether they are printed or handwritten since a text block may be only partially handwritten. To achieve this, FIG. 20 is modified at step S2105 by omitting the averaging step and conducting the comparison on a character by character basis.

The character score calculation is more accurate if printed characters are selected from the characters in the text block which includes both of printed characters and handwritten characters and selected characters are used in the character score calculation. For this, it is determined whether the character is a printed character or not and a printed character is selected before the determination in step S2107. The determining process and the process in step S2105 are otherwise the same. The process is executed on the basis of character recognition score.

A further alternative example is now described in which spurious incomplete characters or figures associated with a tear line are excluded from the approximate matching process by setting off-set coordinates which define a lefthand and an upper margin which are excluded from the process.

The form may be a piece of a document cut on a cutting line as shown in FIG. 22 (A). In this case, the input image includes incomplete characters of a message such as "CUT HERE" or an incomplete figure such as a drawing of a pair of scissors. If the incomplete part of the character or drawing were to be used in character recognition or character score calculation, the result would be inaccurate. The process of step S402 in FIG. 9 may be modified to includes the process shown in the flowchart of FIG. 23 for more accurate character recognition and character score calculation. The process is executed on the basis of the data comprised in the text block structure data of the form.

In the following description and in FIG. 23, coordinates X and Y refer to horizontal and vertical measurements respectively relative to an origin at the top left corner of the cut document as illustrated in the lower portion of FIG. 22.

Values of X and Y corresponding to an off-set are calculated in accordance with the flowchart of FIG. 23 such that the off-set X corresponds to a distance between the left margin and the closest edge of a block which is to be processed. Similarly, off-set Y is to be determined as corresponding to the vertical off-set between the horizontal cut edge of the form in FIG. 22 and the uppermost edge of the closest block to be processed.

The process shown in FIG. 23 eliminates incomplete characters and figures by comparing dimensions of extracted blocks with width and height thresholds.

In step S2301, Xmin representing a minimum value of all left edges of blocks and Ymin representing a minimum value of all upper edge of blocks comprised in the form structure data are obtained. Parameters X1 and Y1 are set to Xmin and Ymin respectively. X1 and Y1 represent a temporary off-set position. X and Y are set to a maximum value in step S2303.

Block data is selected from the text block structure data in step S2307. The flow shifts to step S2329 if any unprocessed block is in it. It is determined in step S2307 whether or not the block selected in step S2305 is a noise block on the basis of the block size. The flow shifts to step S2309 if it is determined the block is not a noise block and the flow return to step S2305 and another block is selected from the form structure data if it is determined the block is a noise block. It is determined in step S2309 whether or not the block is a text block. The flow shifts to step S2311 if it is determined that the block is a text block and it is determined the left edge of block Xb and X1 are the same. If Yes, the flow shifts to step S2313 and it is determined the block width Wb is equal to or bigger than the predetermined threshold width Wth. Comparing the left edge of block and X1 identifies whether the block is at the left end of the form and the block may a part of cutting line. To compare the block width of the block which may a part of cutting line and the threshold width Wth identifies whether the block is a dot comprising the cutting line. The flow shifts to step S2315 if No in step S2309 or S2311. The flow also shifts to step S2315 if the block width Wb is equal to or bigger than Wth.

In step S2315, it is determined whether the left edge of block Xb is smaller than X, namely the left edge of block Xb is at left hand of X, the flow shifts to step S2317 if Yes. The value of Xb is set to X in step S2317. The flow shifts to step S2319 if No in step S2315.

It is determined whether or not the block is a text block in step S2319 and if Yes, the flow shifts to step S2321. In step S2321, it is determined whether the upper edge of block Yb and Y1 are the same. If Yes, the flow shifts to step S2323 and it is determined whether the block height Hb is equal to or bigger than the predetermined threshold height Hth. To compare the upper edge of block and Y1 identifies whether the block is at the upper end of the form and the block may a part of cutting line. To compare the block height of the block which may a part of cutting line and the threshold height Hth identifies whether the block is a dot comprising the cutting line. The flow shifts to step S2325 if No in step S2319 or S2321. The flow also shifts to step S2325 if the block height Hb is equal to or bigger than Hth.

In step S2325, it is determined whether the upper edge of block Yb is smaller than Y, namely the upper edge of block Yb is at upper hand of Y, the flow shifts to step S2327 if Yes. The value of Y is set to Yb in step S2327. The flow shifts to step S2329 if No in step S2325.

This process realize an accurate character recognition and character score calculation where an unsuitable block is extracted since an off set value is determined for excluding the unsuitable block.

X and Y are set to 0 if there is not any block being suitable for off-set determination in the form.

In each of the above embodiments, the character code is obtained by character recognition processing. The character recognition process is applied to an area defined as a character area which is to be subject to character recognition and may include characters in the table structure.

This invention may be realized by a system or device comprising a computer (alternatively, CPU or MPU) which executes the process on the basis of software program code read out from a memory medium or a storage medium. In this case, the mediums storing the program code realize the process of this invention. Also an operating system may realize a part of or all of process of this invention by executing the process on the basis of the program code.

The program code read out from the medium may be stored in function expansion card or function expansion unit inserted in a computer. A processor such as a CPU arranged in the function expansion card or function expansion unit may execute a part of or all of the process of this invention.

The present invention can be implemented by a computer program operating on a standard desktop computer. An aspect of the present invention thus provides a storage medium storing process implementable instructions for controlling a processor to carry out the method as described above.

Further, the computer program can be obtained in electronic form for example by downloading the code over a network such as the Internet. Thus in accordance with another aspect of the present invention there is provided an electrical signal carrying processor implementable instructions for controlling a processor to carry out the method as described above.

The invention claimed is:

1. A method of classifying forms comprising one or more processor implementing the steps of:

registering a plurality of template forms with features of table attribute areas included in each template form, the features including information of the position and size of each table area;

inputting image data representative of an input form;

segmenting the input image data into a plurality of areas, each area having one of a plurality of attributes, wherein the plurality of attributes includes a table attribute, a frame attribute, and a figure attribute;

extracting features of the plurality of areas segmented in said segmenting step;

performing an approximate selection, by selecting some template forms from among the plurality of registered template fonts according to a result of comparison between the features extracted from the segmented table attribute areas of the input form and the features of table attribute areas of the registered template forms, wherein the compared features include the numbers of areas;

calculating each score of some template forms selected in said approximate selection step by comparing the extracted features of the plurality of segmented areas of the input form with the features of table attribute areas of the some template forms selected in said approximate selection step, wherein the compared features of the input form include information of the position and size of the areas having the table attribute or the frame attribute or the figure attribute, and wherein the compared features of the some template forms are information of the position and size of the areas having the table attribute;

making a further selection by selecting a template form matching the input form from among the some template forms selected in said approximate selecting step based on the scores calculated in said calculating step; and outputting an output corresponding to the template form selected in said further selection step.

2. A method according to claim 1, wherein, in said approximate selection step, some template forms are selected based on a number of cells of a predetermined area having the table attribute.

3. A method according to claim 1, wherein, in said calculating step, the features of table attribute areas of the some template forms selected in said approximate selection step are compared with the features of areas having a table attribute, a frame attribute or a figure attribute of the input form.

4. A method according to claim 1, wherein said calculating step calculates the scores representative of matching between the input form and each of the some template forms selected in said approximate selection step, and wherein, in said further selection step, a template form having a highest score is selected.

5. A method according to claim 1, further comprising the step of setting a reference value which is used for the selection in said approximate selection step.

6. A method according to claim 5, wherein said setting step further comprises storing the set reference value in a memory for use in said approximate selection step.

7. A method according to claim 5, wherein, in said setting step, a respective comparison reference value is set for each template form based on characteristics of the tables of the template form.

8. A method according to claim 7, wherein said setting step further comprises storing the respective comparison reference value for each of the template forms.

9. A method according to claim 1, further comprising the step of setting a search mode for the selection in said approximate selection step, wherein, in said approximate selection step, the template forms are selected in accordance with the set search mode.

10. A method according to claim 1, wherein, in said approximate selection step, a multistage approximate selection process is executed, each stage of the multistage approximate selection process using a different reference value for each selection.

11. A method according to claim 10, wherein each stage of the multistage approximate selection process is executed for the template forms approximate selected before the stage.

12. A method according to claim 11, wherein each stage of the multistage approximate selection process is executed in a predetermined sequence when a normal search mode is set.

13. A method according to claim 10, wherein each stage of the multistage approximate selection process is executed in a predetermined order, and wherein, if approximate selection of at least one template form occurs within a stage of the multistage approximate selection process, the approximate selected template forms are subject to said comparing step without performing a further stage of the multistage approximate selection process.

14. A method according to claim 13, wherein said approximate selecting step is performed in response to setting of a fast search mode.

15. A method according to claim 10, wherein each stage of the multistage approximate selection process is executed by measuring similarities between predetermined attributes of the input form and corresponding attributes of the template form.

16. A method according to claim 10, wherein one stage of the multistage approximate selection process selects based on a condition that the number of tables in the input form matches the number of tables in the template form and the number of cells in the largest table of the input form equals the number of cells in the largest table in the template form.

17. A method according to claim 10, wherein one stage of the multistage approximate selection process selects based on a condition that the number of tables in the input form matches the number of tables in a template form and the number of cells in the largest table of the input form differs from the number of cells in the largest table of the template form by a number which is less than or equal to a threshold value.

18. A method according to claim 10, wherein one stage of the multistage approximate selection process selects based on a condition that a number of segmented areas from the input form matches a number of segmented areas from the template form.

19. A method according to claim 18, wherein a segmented area is defined as comprising any one of a table, frame, figure or line.

20. A method according to claim 1, wherein said calculating step includes the steps of:
performing character recognition processing on at least one text block in the input form; and
calculating the scores by comparing results of recognition with corresponding results obtained by performing character recognition on template forms.

21. A method according to claim 20, wherein said calculating the scores by comparing results of recognition step includes the step of:
determining whether characters of the text block arc handwritten characters based on a degree of matching between extracted characters and dictionary characters and, if so determined, excluding the character recognition results of the text block from use for the calculation of the score.

22. A method according to claim 20, wherein said calculating the scores by comparing results of recognition step includes the step of determining whether characters of the text block are incomplete characters and, if so determined, excluding the text block containing incomplete characters from the approximate comparing step.

23. A method according to claim 1, wherein, in said segmentation step, the image data is segmented based on blocks containing contiguous black pixels.

24. An apparatus for classifying forms, comprising:
registration means for registering a plurality of template forms with features of table attribute areas included in each template form, the features including information of the position and size of each table area;
input means for inputting image data representative of an input form;
segmenting means for segmenting the input image data into a plurality of areas, each area having one of a plurality of attributes, wherein the plurality of attributes includes a table attribute, a frame attribute, and a figure attribute;
extracting means for extracting features of the plurality of areas segmented in said segmenting step;
approximate selection means for selecting some template forms from among the plurality of registered template forms according to a result of comparison between the features extracted from the segmented table attribute areas of the input form and the features of table attribute areas of the registered template forms, wherein the compared features include the numbers of areas;
calculating means for calculating each score of some template forms selected in said approximate selection stop by comparing the extracted features of the plurality of segmented areas of the input form with the features of table attribute areas of the some template forms selected in said approximate selection step, wherein the compared features of the input form include information of the position and size of the areas having the table attribute or the frame attribute or the figure attribute, and wherein the compared features of the some template forms are information of the position and size of the areas having the table attribute;
means for making a further selection by selection a template form matching the input form from among the some template forms selected in said approximate selecting step based on the scores calculated in said calculating step; and
output means for outputting an output corresponding to the template form selected by said means for performing further selection.

25. An apparatus according to claim 24, wherein said approximate selection means selects some of the template forms based on a number of cells of a predetermined area having the table attribute.

26. An apparatus according to claim 24, wherein said calculating means compares the features of table attribute areas of the some template forms selected by said approximate selection means with the features of areas having a table attribute, a frame attribute and a figure attribute of the input form.

27. An apparatus according to claim 24, wherein said calculating means comprises means for calculating scores representative of matching between the input form and each of the some template forms selected by said approximate selection means, and wherein said means performing a further selection selects a template form having a highest score.

28. An apparatus according to claim 24, further comprising a setting means for setting a reference value which is used for the selection by said approximate selection means.

29. An apparatus according to claim 28, wherein said setting means stores the set reference value in a memory for use by said approximate selection means.

30. An apparatus according to claim 28, wherein said setting means sets a respective comparison reference value for each template form based on characteristics of the tables of the template form.

31. An apparatus according to claim 30, wherein said setting means stores the respective comparison reference values for each of the template forms.

32. An apparatus according to claim 24, further comprising a mode setting means for setting a search mode for the selection performed by said approximate selection means, wherein said approximate selection means selects the template forms in accordance with the set search mode setting input.

33. An apparatus according to claim 24, wherein said approximate selection means executes a multistage approximate selection process, each stage of the multistage approximate selection process using a different reference value for each selection.

34. An apparatus according to claim 33, wherein each stage of the multistage approximate selection process is executed for the template forms approximate selected before the stage.

35. An apparatus according to claim 34, wherein each stage of the multistage approximate selection process is executed in a predetermined sequence when a normal search mode is set.

36. An apparatus according to claim 33, wherein each stage of the multistage approximate selection process is executed in a predetermined order, and wherein, if any approximate selection of at least one template form occurs within a stage of the multistage approximate selection process, the approximate selected template forms are subject to said comparing means without performing a further stage of the multistage approximate selection process.

37. An apparatus according to claim 36, wherein selection by said approximate selection means is performed in response to a fast search mode being set.

38. An apparatus according to claim 33, wherein each stage of the multistage approximate selection process is executed by measuring similarities between predetermined attributes of the input form and corresponding attributes of the template form.

39. An apparatus according to claim 33, wherein one stage of the multistage approximate selection process selects based on a condition that the number of tables in the input form matches the number of tables in the template form and the number of cells in the largest table of the input form equals the number of cells in the largest table in the template form.

40. An apparatus according to claim 33, wherein one stage of the multistage approximate selection process selects based on a condition that the number of tables in the input form matches the number of tables in a template form and the number of cells in the largest table of the input form differs from the number of cells in the largest table of the template form by a number which is less than or equal to a threshold value.

41. An apparatus according to claim 33, wherein one stage of the multistage approximate selection process selects based on a condition that a number of segmented areas from the input form matches a number of segmented areas from the template form.

42. An apparatus according to claim 41, wherein a segmented area is defined as comprising any one of a table, frame, figure or line.

43. An apparatus according to claim 24, wherein said calculating means further comprises:
performing means for performing character recognition processing on at least one text block in the input form; and
recognition-result comparing means for comparing results of recognition with corresponding results obtained by performing character recognition on template forms.

44. An apparatus according to claim 43, wherein said recognition-result comparing means determines whether characters of the text block are handwritten characters based on a degree of matching between extracted characters and dictionary characters and, if so determined, excludes the character recognition results of the text block from comparison by said recognition comparing means.

45. An apparatus according to claim 43, wherein said recognition-result comparing means determines whether characters of the text block are incomplete characters and, if so determined, excluding the text block containing incomplete characters from comparison by said comparison means.

46. An apparatus according to claim 24, wherein said segmenting means segments the image data based on blocks containing contiguous black pixels.

47. A computer readable medium storing processor implementable instructions for controlling a processor to carry out the steps of:
registering a plurality of template forms with features of table attribute areas included in each template form, the features including information of the position and size of each table area;
inputting image data representative of an input form;
segmenting the input image data into a plurality of areas, each area having one of a plurality of attributes, wherein the plurality of attributes includes a table attribute, a frame attribute, and a figure attribute;
extracting features of the plurality of areas segmented in said segmenting step;
performing an approximate selection by selecting some template forms from among the plurality of registered template forms according to a result of comparison between the features extracted from the segmented table attribute areas of the input form and the features of table attribute areas of the registered template forms, wherein the compared features include the numbers of areas;
calculating each score of some template forms selected in said approximate selection step by comparing the extracted features of the plurality of segmented areas of the input form with the features of table attribute areas of the some template forms selected in said approximate selection step, wherein the compared features of the input form include information of the position and size of the areas having the table attribute or the frame attribute or the figure attribute, and wherein the compared features of the some template forms are information of the position and size of the areas having the table attribute;
making a further selection by selecting a template form matching the input form from among the some template forms selected in said approximate selecting step based on the scores calculated in said calculating step; and
outputting an output corresponding to the template form selected in said further selection step.

48. A computer implementable program stored on a computer-readable medium for controlling a processor to carry out the steps of:
registering a plurality of template forms with features of table attribute areas included in each template form, the features including information of the position and size of each table area;
inputting image data representative of an input form;
segmenting the input image data into a plurality of areas, each area having one of a plurality of attributes, wherein the plurality of attributes includes a table attribute, a frame attribute, and a figure attribute;
extracting features of the plurality of areas segmented in said segmenting step;
performing an approximate selection by selecting some template forms from among the plurality of registered template forms according to a result of comparison between the features extracted from the segmented table attribute areas of the input form and the features of table attribute areas of the registered template forms, wherein the compared features include the numbers of areas;
calculating each score of some template forms selected in said approximate selection step by comparing the extracted features of the plurality of segmented areas of the input form with the features of table attribute areas of the some template forms selected in said approximate selection step, wherein the compared features of the input form include information of the position and size of the areas having the table attribute or the frame attribute or the figure attribute, and wherein the compared features of the some template forms are information of the position and size of the areas having the table attribute;

making a further selection by selecting a template form matching the input form from among the some template forms selected in said approximate selecting step based on the scores calculated in said calculating step; and outputting an output corresponding to the template form selected in said further selection step.

* * * * *